United States Patent
Brown et al.

(10) Patent No.: US 7,108,457 B1
(45) Date of Patent: Sep. 19, 2006

(54) SYSTEM AND METHOD FOR REDUCING DRAG AND VORTEX INDUCED VIBRATION IN MARINE APPLICATIONS

(75) Inventors: Neal A. Brown, San Marcos, CA (US); Victor G. Grinius, San Diego, CA (US); Cam M. Shaar, Santa Barbara, CA (US)

(73) Assignee: High Seas Engineering LLC, Escondido, CA (US)

( * ) Notice: Subject to any disclaimer, the term of this patent is extended or adjusted under 35 U.S.C. 154(b) by 311 days.

(21) Appl. No.: 09/875,209

(22) Filed: Jun. 4, 2001

Related U.S. Application Data

(63) Continuation-in-part of application No. 09/697,382, filed on Oct. 25, 2000, now Pat. No. 6,349,664, which is a continuation of application No. 09/213,597, filed on Dec. 16, 1998, now Pat. No. 6,148,751.

(51) Int. Cl.
*B63B 1/34* (2006.01)

(52) U.S. Cl. .................. 405/216; 405/211; 114/144 B; 114/67 R; 114/67 A

(58) Field of Classification Search .......... 114/230.1, 114/269, 144 B, 265, 67 A, 67 R, 264, 150, 114/151, 121, 122, 123; 405/211, 212, 213, 405/216
See application file for complete search history.

(56) References Cited

U.S. PATENT DOCUMENTS

| | | | |
|---|---|---|---|
| 2,663,276 A | | 12/1953 | Ouellet |
| 3,614,032 A | * | 10/1971 | Purcell, Jr. .................... 244/36 |
| 3,667,239 A | | 6/1972 | Mott |
| 3,762,352 A | * | 10/1973 | Brahtz .................... 114/265 X |
| 3,763,810 A | * | 10/1973 | Payne ........................ 114/285 |
| 3,894,504 A | * | 7/1975 | Smtih ...................... 405/211 X |
| 4,300,855 A | * | 11/1981 | Watson ................... 405/211 X |
| 4,505,617 A | * | 3/1985 | Miller et al. ................. 405/211 |
| 5,117,882 A | * | 6/1992 | Stanford .................... 114/67 A |
| 5,908,217 A | | 6/1999 | Englar |
| 6,027,286 A | * | 2/2000 | Pollack ..................... 405/195.1 |
| 6,148,751 A | * | 11/2000 | Brown et al. ............. 114/67 A |

(Continued)

FOREIGN PATENT DOCUMENTS

FR 586613 3/1925

OTHER PUBLICATIONS

Brown, N.A., Report of the ATC Hydro-Propulsion Committee, Feb. 28, 1979.

(Continued)

*Primary Examiner*—Sunil Singh
(74) *Attorney, Agent, or Firm*—Fish & Richardson P.C.

(57) ABSTRACT

A marine riser that includes active boundary-layer control ("BLC") for reducing hydrodynamic drag and vortex-induced-vibration ("VIV") caused by currents. The marine riser includes at least one riser pipe surrounded by a BLC sheath. Extending through the sheath is at least one nozzle, preferably at least one pair of slot-nozzles, for discharging water into the sea in which the marine riser is deployed. The BLC sheath may be rotate-able to align a pair of slit-nozzles with the current direction, or in a fixed BLC sheath, pairs of slot-nozzles may be selectively activated based on the current direction. The BLC sheath may also include a tail-jet or retractable tail-fin. The BLC sheath may be formed from telescoping sections that decrease in diameter toward the bottom of the riser and that are nested when the telescoping sheath is retracted. Finally, a BLC system may also be implemented in a production riser system.

4 Claims, 21 Drawing Sheets

U.S. PATENT DOCUMENTS

| | | | |
|---|---|---|---|
| 6,349,664 B1 * | 2/2002 | Brown et al. | 114/264 |
| 6,551,029 B1 * | 4/2003 | Shu et al. | 405/211 |
| 2002/0035957 A1 * | 3/2002 | Fischer, III | 114/230.1 |

OTHER PUBLICATIONS

P. Carriere and E.A. Eichelbrenner, "Theory of Flow Reattachment by a Tangential Jet Discharging Against A Strong Adverse Pressure Gradient," in Boundary-layer and flow control, vol. I, G.V. Lachmann, ed., Pergamon Press, New York, 1961.

Paul K. Chang, "Control of Flow Separation Energy Conservation, Operational, Efficiency, and Safety," Chapter 5, Series in Thermal and Fluids Engineering, James P. Hartnett and Thomas F. Irvine, Jr., eds., Hemisphere Publishing Corp., McGraw-Hill Book Company, pp. 286-412.

J.B. Freund & M.G. Mungal, "Drag Modification and Wake Control of an Axisymmetric Bluff Body Using the Canada Effect," Mechanical Engineering Department, Stanford University, Stanford, CA, 1992 p. 775-784 (published by the American Institute of Aeronautics and Astronautics, Inc.).

Terry N. Gardner & M. Wayne Cole, Jr., "Deepwater Drilling in High Current Environment" 4th Annual OTC in Houston, TX, May 3-6, 1982.

F.R. Goldschmied, "Integrated Hull Design, Boundary-Layer Control, and Propulsion of Submerged Bodies," Journal of Hydronautics, vol. 1, No. 1, pp. 2-11, 1967.

Sighard F. Hoerner, "Aerodynamic Drag and Hydrodynamic Resistance" published by the author, 1958, 26-28.

James E. Hubbartt and Louis H. Bangert, "Turbulent/Boundary Layer Control by a Wall Jet," AIAA Paper 70-107, 8th Aerospace Sciences Meeting, New York, NY/Jan. 19-21, 1970.

Bryan Thwaites, "Incompressible Aerodynamics An Account of the Theory and Observation of the Steady Flow of Incompressible Fluid past Aerofoils, Wings, and Other Bodies," Oxford, Oxfordshire: Clarendon Press, 1960 pp. 226-229.

Zandieh, A. & J.G. Leishman, "Boundary Layer ad Pressure Measurements on a Cylinder with Unsteady Circulation Control," AIAA Journal, vol. 3, No. 10, Oct. 1993.

* cited by examiner

PRESSURE DISTRIBUTION ON A CIRCULAR CYLINDER

PRESSURE RISE TO SEPARATION
(FROM HUBBART & BANGERT, 1970)

SYSTEM AND METHOD FOR REDUCING DRAG AND VORTEX INDUCED VIBRATION IN MARINE APPLICATIONS

CROSS-REFERENCE TO RELATED APPLICATIONS

This application is a continuation-in-part application of and claims priority to U.S. Application Ser. No. 09/697,382, filed on Oct. 25, 2000, now U.S. Pat. No. 6,349,664, which is a continuation of U.S. Application Ser. No. 09/213,597, filed on Dec. 16, 1998, now U.S. Pat. No. 6,148,751.

TECHNICAL FIELD

This invention relates to marine drilling risers, production risers and drilling platforms. More particularly, this invention relates to a system and method for reducing vortex-induced vibration ("VIV") and hydrodynamic drag on marine risers and drilling platforms.

BACKGROUND

Hydrodynamic drag forces and vortex-induced vibration ("VIV") are consequences of flow separation, which is, in turn, a result of boundary-layer separation. Boundary layer separation refers to the inability of an energy-depleted boundary-layer to resist an adverse pressure gradient and therefore to succumb to back flow. As the pressure gradients on the surface of a circular cylinder (for example, a drilling riser) in a current are severe, the boundary layer usually separates from the surface at the first encounter with an increasing pressure, usually near points about 90 degrees from the onset current direction. Surface roughness can worsen this behavior.

With a separated flow, the pressure distribution is changed so that the pressure on the downstream side of the drilling riser is more uniform and close to that of the ambient, whereas the pressure on the upstream side is higher—reaching the impact pressure of the current velocity, as shown, for example, in FIG. 2. The result is a pressure difference between the up- and downstream faces of the cylinder which yields a streamwise force termed the pressure drag or the form drag. The actual frictional drag on the attached-flow upstream side is but a very small part of the form drag.

A shear force exists between the separated region of low-velocity flow and the exterior, current-velocity flow. This is manifest by surfaces of vorticity on both sides of the slow wake region. Unfortunately, this vorticity is in unstable equilibrium if distributed uniformly. Rather, the vorticity becomes organized into a stable configuration of discrete vortices of opposite sense and alternating position across the wake. The continued generation of these alternating vortices is accompanied by a corresponding fluctuation in the circulation (integrated peripheral velocity) about the cylinder. This alternating circulation, when combined with the average onset current velocity yields strong alternating lateral lift forces (and some drag forces) on the cylinder. The vibration which may result is vortex-induced, i.e., VIV.

Therefore, VIV is associated with form drag, which is the result of boundary-layer separation. If the form drag can be significantly reduced or eliminated, VIV will be substantially eliminated as well.

According to Bernoulli's equation, the ability of a flow to overcome an adverse pressure gradient—one that tends to retard the flow—is balanced by the inherent kinetic energy of that flow, in ideal (potential) flows. In real flows with inherent viscous loss mechanisms, it seems that with thermodynamic certainty there is insufficient energy available in the originating flow to overcome such losses.

In the past, passive flow control has been used in an effort to prevent flow separation at the boundary-layer in marine bodies, such as drilling platforms and marine risers. An example of a prior art passive flow control system is shown in FIGS. 1A and 1B, which depict a marine riser 100. Marine risers 100 are used, for example, to connect a floating drilling vessel 102 to the ocean floor 104 and to provide a conduit for a drill string and drilling fluids. When beset by ocean currents 106, marine riser 100 will exhibit substantial hydrodynamic drag forces and VIV. Such forces and motions induce mechanical stresses in, and deflections of, the marine riser 100 and its connection 110 to the drilling vessel 102 and connection 112 to the ocean floor 104, which ultimately may result in failure or interference with drilling operations.

Drag and VIV have been reduced by the application of fairings 114 to the marine riser 100. The fairings 114 are enabled passively to rotate about the riser 100 in order to align with the direction of the current 106 to minimize drag. While some drag and VIV reduction is thereby obtained, the procedure for applying and removing fairing segments from riser joints while they are being run and retrieved is lengthy. Slowed riser deployment and retrieval reduces availability and safety of the drilling rig, with important economic consequences. Fairings 114 suffer another disadvantage, in that fairing sections are bulky, expensive, and subject to damage when being deployed through the ocean surface wave zone.

Other techniques for preventing flow separation apply active means, specifically, energetic boundary-layer control ("BLC"). In one such technique, boundary-layer separation is avoided by removing the boundary-layer using suction. For example, suction has been used on terrestrial or airborne moving bodies (such as automobiles and aircraft) by sucking air into the body interior through pores or slots in the body's skin. With the low energy boundary-layer flow removed, the surface is wetted by the high-energy external flow, which, by Bernoulli's principle, can just overcome an adverse pressure gradient that was created by the body itself.

Suction works well in wind tunnels and has also been applied with some success to aircraft wings, not only to reduce pressure drag and promote laminar flow, but also to achieve high lift. Its use in seawater, however, is confounded by the ubiquity of particulate matter and bio-fouling. The porous or multi-slotted skin also tends to be far too fragile for marine application, and too costly.

Another technique involves moving the body in such a way that its tangential motion can be imparted to the wetted surface itself with a velocity equal to or greater than that of the local external flow. If this is done correctly, then there is no retarding shear, and the flow has no cause to separate. This has been successfully attempted with strategically located imbedded rotating cylinders, for example, or with mechanically driven flat belts. Indeed, if an entire circular cylinder is rotated about its axis in a fluid current we have a Flettner Rotor that generates substantial lift forces by its induced circulation. Such rotational techniques, however, would be difficult and costly to implement on a drilling riser or marine platform.

An alternative technique is to discharge or eject fluid out of the body and into the surrounding atmosphere. This technique has been used in automobiles and aircraft. The inventors recognized the application of this technique in marine applications, devising the system and method described and claimed in U.S. Pat. No. 6,148,751, which is incorporated by reference into this application. In the patented system, water can be energetically discharged from a stationary, submerged surface. From another viewpoint, the shear-retarded boundary layer is re-energized by the discharge of a high velocity jet of fluid at some streamwise location before separation occurs. The jets must discharge fluid at velocities higher than that of the local external flow at the ejection locations. This is done in order for the jets themselves to avoid separation in face of the adverse pressure gradients imposed by that external flow. As described in the referenced patent, thin slot nozzles, for example, may be used to discharge fluid that conforms to the curved wall of a circularly-cylindrical body by means of the Coanda effect. This conforming ejected fluid (called "wall-jets") will be retarded by shear at the stationary wall, by shear against the slower external flow, and by those pressure gradients. However, the wall-jets are endowed with energy much larger than that of the external flow.

Marine drilling risers beset by ocean currents exhibit unique characteristics, and it would be advantageous to have an active BLC system that conforms to these characteristics. For marine drilling risers, the requirements of compactness and buoyancy, conditions of remoteness, and deployment/retrieval are most demanding. On the other hand, the payoffs for significant reductions of drag and VIV are quite apparent.

Accordingly, the present invention provides an active BLC system designed for use with marine drilling risers. Those skilled in the art, however, will recognize that the present invention is not limited solely to marine drilling risers. There may be other marine applications where the present invention has practical and advantageous application for reducing boundary-layer separation and associated hydrodynamic drag and VIV.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1A:
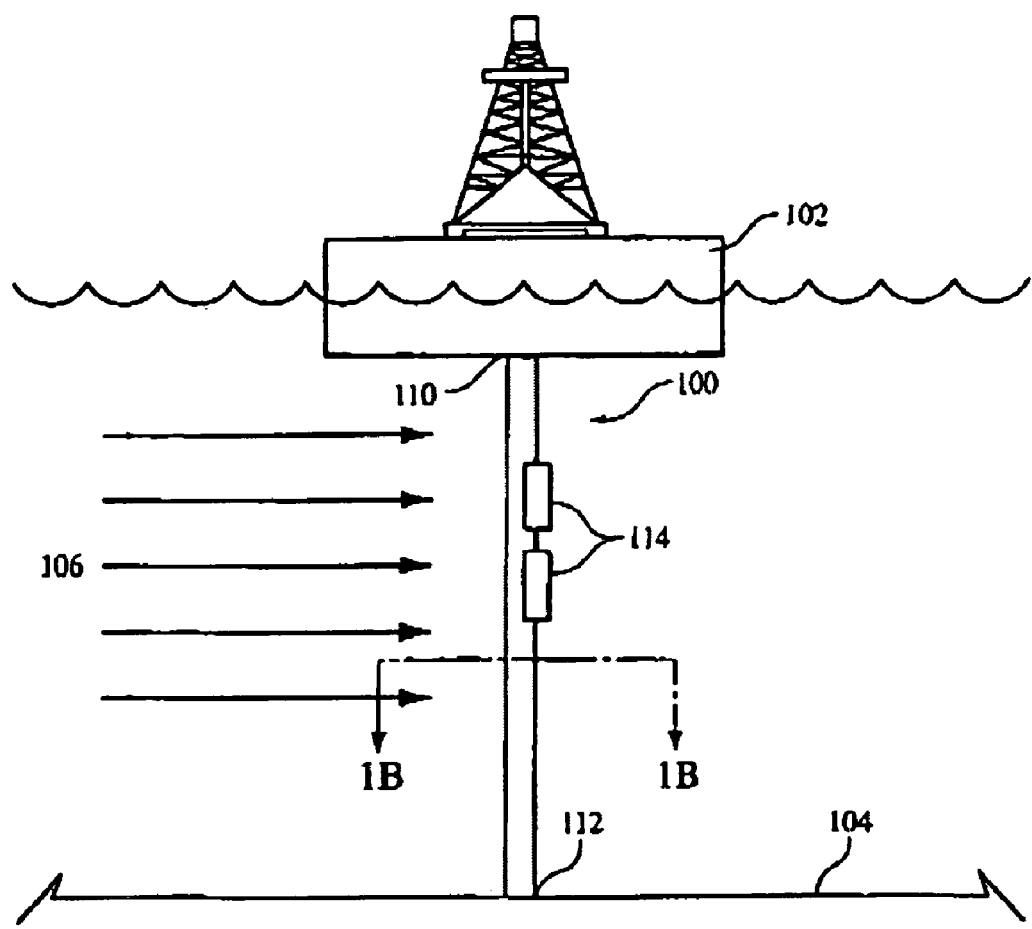
FIG. 1A is a side view of a marine drilling platform coupled to ocean floor by a prior art marine drilling riser.
Figure 1B:
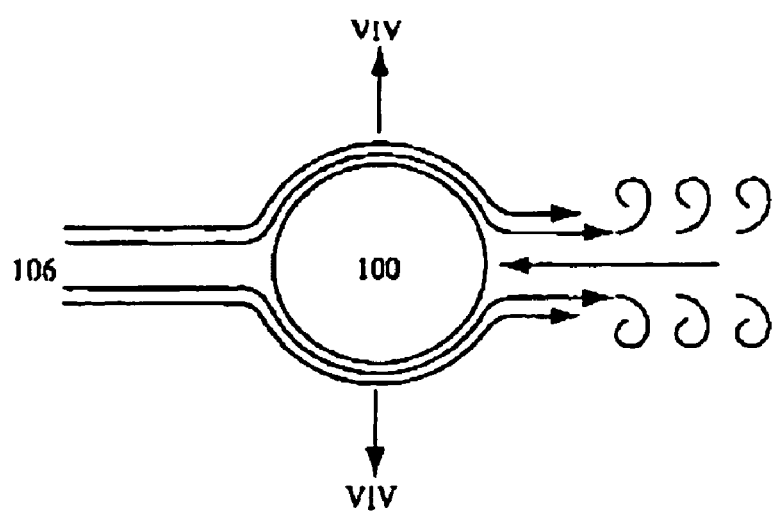
FIG. 1B is a top view of the marine drilling riser of FIG. 1A taken along the line 1B—1B.
Figure 2B:
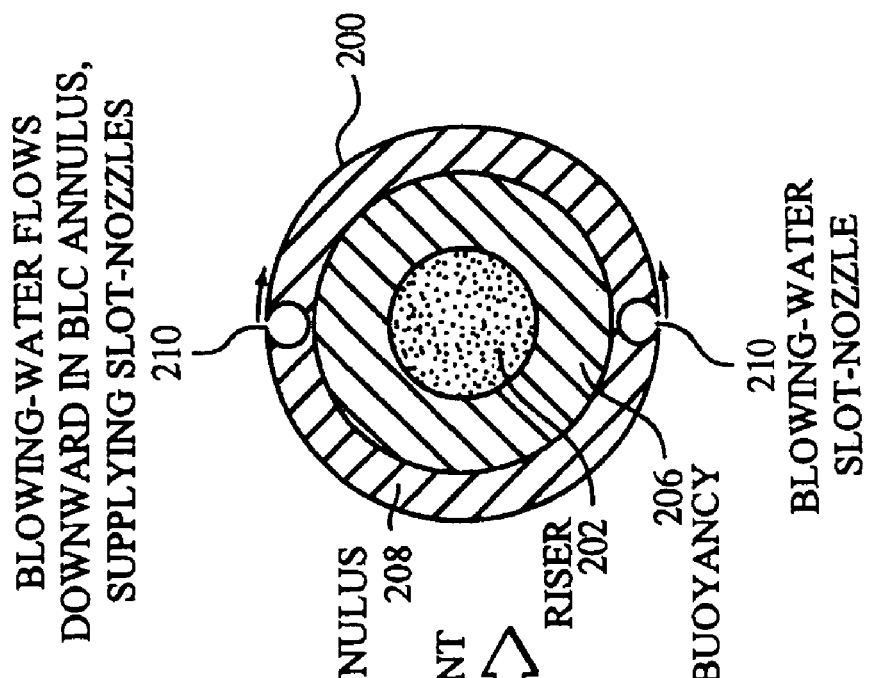
FIG. 2B is a top view taken along line 2B—2B of the marine drilling riser of FIG. 2A.
Figure 2A:
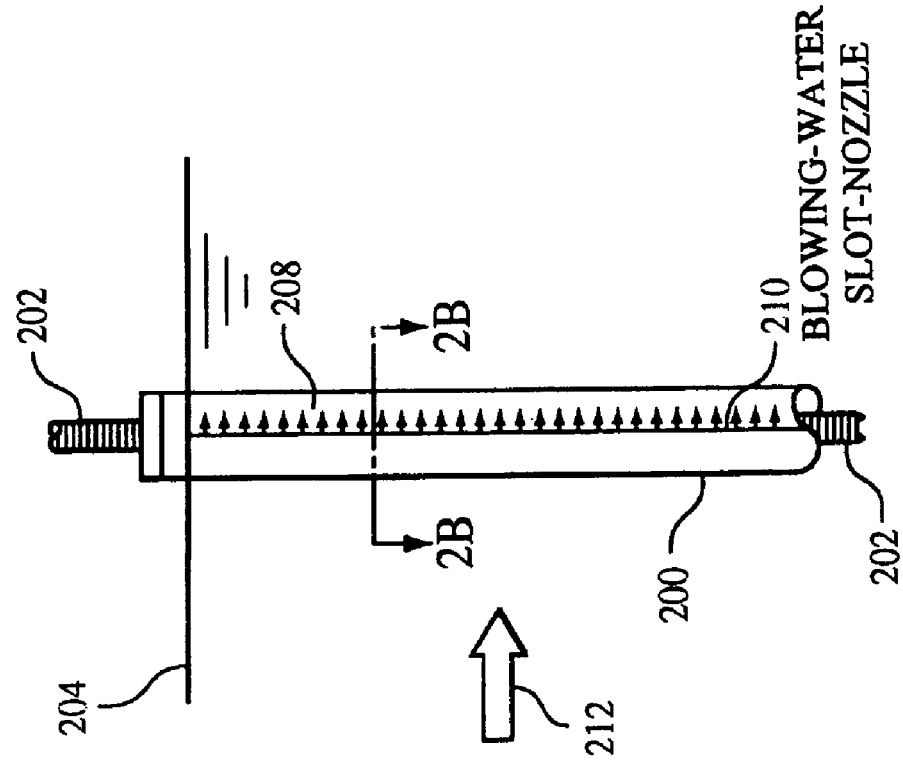
FIG. 2A is a side view of a portion of a marine drilling riser equipped with BLC in accordance with the present invention.

Throughout this specification and for convenience, a circularly-cylindrical body standing vertically in a horizontal fluid current is described and shown as an example of a waterborne body that may employ the system and method of the present invention, for example, as shown by the marine riser 200 of FIGS. 2A and 2B. It is intended, however, that the present invention is not limited to applications involving such shaped and oriented bodies. For example, those skilled in the art will recognize that the present invention could be applied to waterborne bodies having other shapes, such as an elliptical-cylinder, an octagonal-cylinder, a hexagonal-cylinder, or similar multi-sided polygonal, tubular or cylindrical bodies, or any tubular- or cylindrical-elliptical body. Similarly, those skilled in the art will recognize that the waterborne body need not be standing vertically in a horizontal fluid current. Preferably, the elongated dimension of the body (e.g., the vertical dimension of the cylindrical marine riser 200 shown in FIG. 2) will be normal to the direction of the onset current, but such an orientation is not required. For example, the elongated dimension of the waterborne body may be tilted at an angle to the direction of the onset current.

The exemplary marine riser 200 with active BLC shown in FIGS. 2A and 2B includes several concentric elements. At the center of the marine riser 200 is a riser core 202. As can be seen in FIG. 2A, the riser center extends along the full length of the marine riser 200, from the water surface 204 downward. Those skilled in the art will recognize that the marine riser 200 is designed to extend from a drilling platform (not shown) or equivalent to the ocean floor (not shown), or to the bottom of any body of water in which the drilling platform is deployed, e.g., sea, gulf, or lake. The riser core 202 is generally a hollow tube that may be used to carry oil being pumped from the ocean floor to the drilling platform. Surrounding the riser core next outer concentric annulus of the marine riser 200 is a buoyancy annulus 206, which, as the name suggests, is used to provide buoyancy for the marine riser 200, in known fashion. The outermost ring is the BLC annulus 208, which includes slot-nozzles 210 for energetically discharging water (or other fluid) from within the marine riser 200 out into the water surrounding the marine riser 200. As explained in the Background section, the slot-nozzles 210 may tangentially discharge water from inside the marine riser 200 into the surrounding water, as shown by the small vectors of FIG. 2B, which indicate the direction of the water being discharged from the slot-nozzles 210. In this way, the slot-nozzles 210 discharge water in a direction substantially parallel to that of the onset current 212, reducing to the maximum extent possible the boundary-layer separation of the onset current 212 from the exterior hull of the marine riser 200, thereby substantially reducing hydrodynamic drag and VIV.

Figure 2D:
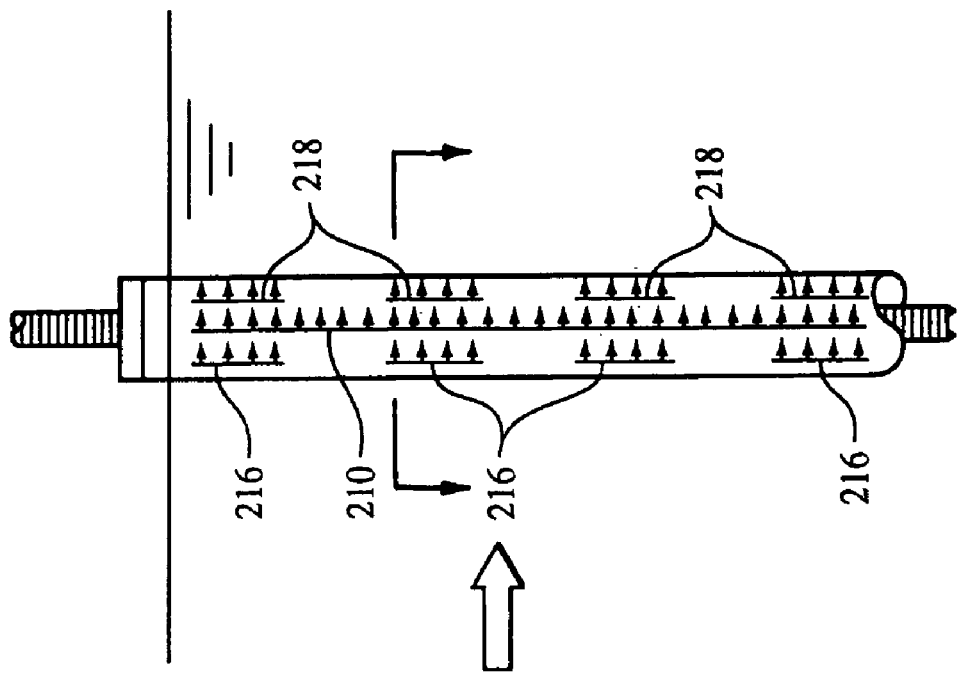
FIG. 2D is another alternative arrangement of slot-nozzles on a marine drillign riser in accordance with the present invention.
Figure 2C:
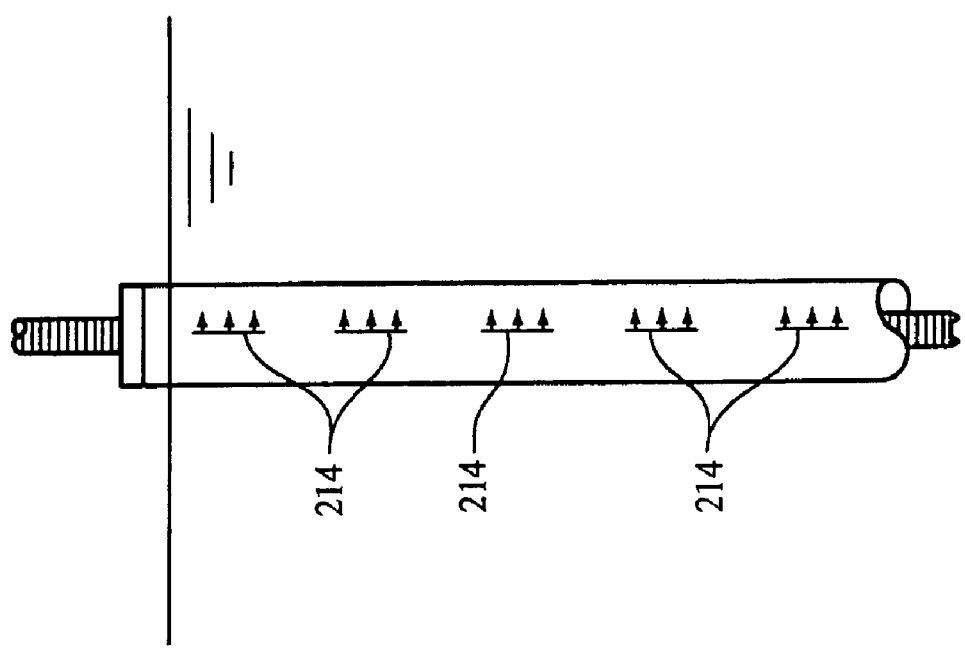
FIG. 2C is an alternative arrangement of slot-nozzles on a marine drilling riser in accordance with the present invention.

The slot-nozzles may extend from bottom to top of the marine riser 200, or may extend only along part of the marine riser 200. In fact, as those skilled in the art will appreciate, just about the marine riser 200 may employ just about any configuration of slot-nozzles 210. For example, instead of the continuous vertical row of slot-nozzles 210 shown in FIG. 2A, separated sections of vertical, linear slot-nozzles 214 may be used, as shown in FIG. 2C. Alternatively, as shown in FIG. 2D, the continuous vertical row of slot-nozzles 210 may be combined with separated sections of vertical, linear slot-nozzles 216, 218, or multiple continuous vertical rows of slot-nozzles may be implemented. It will also be recognized that the present invention is not limited to usage of slot-nozzles; any configuration of pinpoint-nozzles may be used by themselves or in combination with slot-nozzles. The remainder of this specification will refer only to slot-nozzles, however, for convenience.

FIG. 2B shows the slot-nozzles 210 disposed on opposite sides of the BLC annulus 208, approximately 180 degrees from one another when measured angularly along the surface of the BLC annulus 208, for example, one slot-nozzle 210 at 0 degrees and the other at 180 degrees, as shown. However, as denoted by the use of the term "approximately," the slot-nozzles 210 need not be exactly 180 degrees from one another. Instead, each of the pair of slot-nozzles 210 may be located within a range of approximately 5 degrees forward, that is, toward the direction of the onset current 212. In such this embodiment, the upper slot-nozzle 210 shown in FIG. 2B would be located within a range of approximately 0 and 5 degrees, and the lower slot-nozzle 210 shown in FIG. 2B would be located within a range of approximately 175 and 180 degrees. Alternatively, each slot-nozzle 210 may be located within a range of approximately 10 degrees back of the onset current 212. Thus, the upper slot-nozzle 210 would be located within a range of approximately 0 and 350 degrees, and the lower slot-nozzle 210 would be located within a range of approximately 180 and 190 degrees. It has been found that slot-nozzles located within these ranges, i.e., 5 to 350 degrees and 175 to 190 degrees, still achieve effective BLC and thus reduce drag and VIV. It is not intended, however, that the present invention be limited to pairs of slot-nozzles so located. For example, as described in other parts of this application, multiple pairs of slot-nozzles may be used, or it may be found that a pair of slot-nozzles could be located outside these ranges and still achieve at least some degree of BLC.

Figure 3:
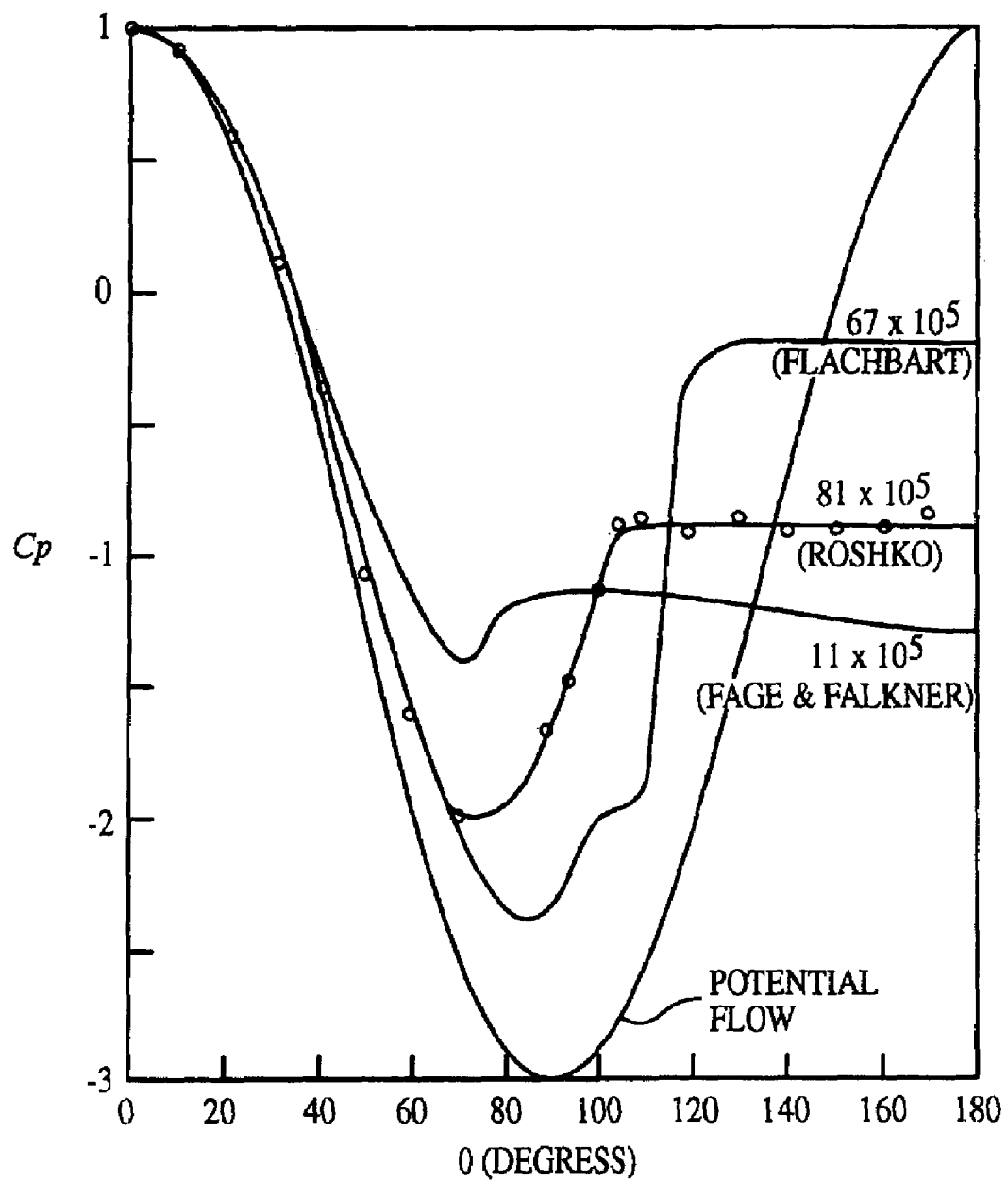
FIG. 3 is a graph of pressure distributions on circular cylinders.

As shown in FIG. 3, the pressure distribution around a circularly-cylindrical body 200 like that shown in FIGS. 2A and 2B is largely that of the flow field outside any boundary layer or separated regions. As in FIGS. 2A and 2B, a pair of vertically continuous slot-nozzles 210 pierce the cylindrical surface. The angular separation of the two slot-nozzles 210 is bisected by the direction of the onset current 212. The slots 210 are located angularly roughly at 90 degrees from the current direction 212, but may depart from that nominal value. The slots 210 are preferably thin and discharge jets of fluid tangentially to the cylindrical surface, as shown by the small arrows in FIGS. 2A and 2B, each fluid jet being in the direction of the flow of the external current 212. Preferably, the fluid jets, called "wall-jets," are the same type of fluid as the fluid surrounding the surface 206. The wall-jets will be found to adhere to their associated curved walls of the cylindrical surface by virtue of the Coanda-effect, rather than separating from the walls.

Several parameters are used to describe the intensity and volume of the BLC discharging process.

First, the Jet Velocity Ratio (JVR) relates the discharge velocity to that of the flow velocity outside the boundary layer at the location of the slot-nozzle. JVR is defined by the following equation:

$$JVR = \left(\frac{U_J}{U_e}\right)_s$$

where: Uj is the jet velocity discharged from the slot-nozzle, Ue is the velocity of the flow external to the boundary layer, and the subscript, s, denotes "at the location of the slot-nozzle." A value of JVR greater than unity must be used. The minimum is generally approximately 2, but those skilled in the art will recognize that JVR may be any value greater than unity, for example, 1.1, 1.2, 1.3, etc. Values up to 5 have been considered. For a circular cylinder, the velocities at points 90 degrees to the current are twice the onset current velocity; meaning that the discharge jet velocity may be 10 times the current velocity.

Figure 4:
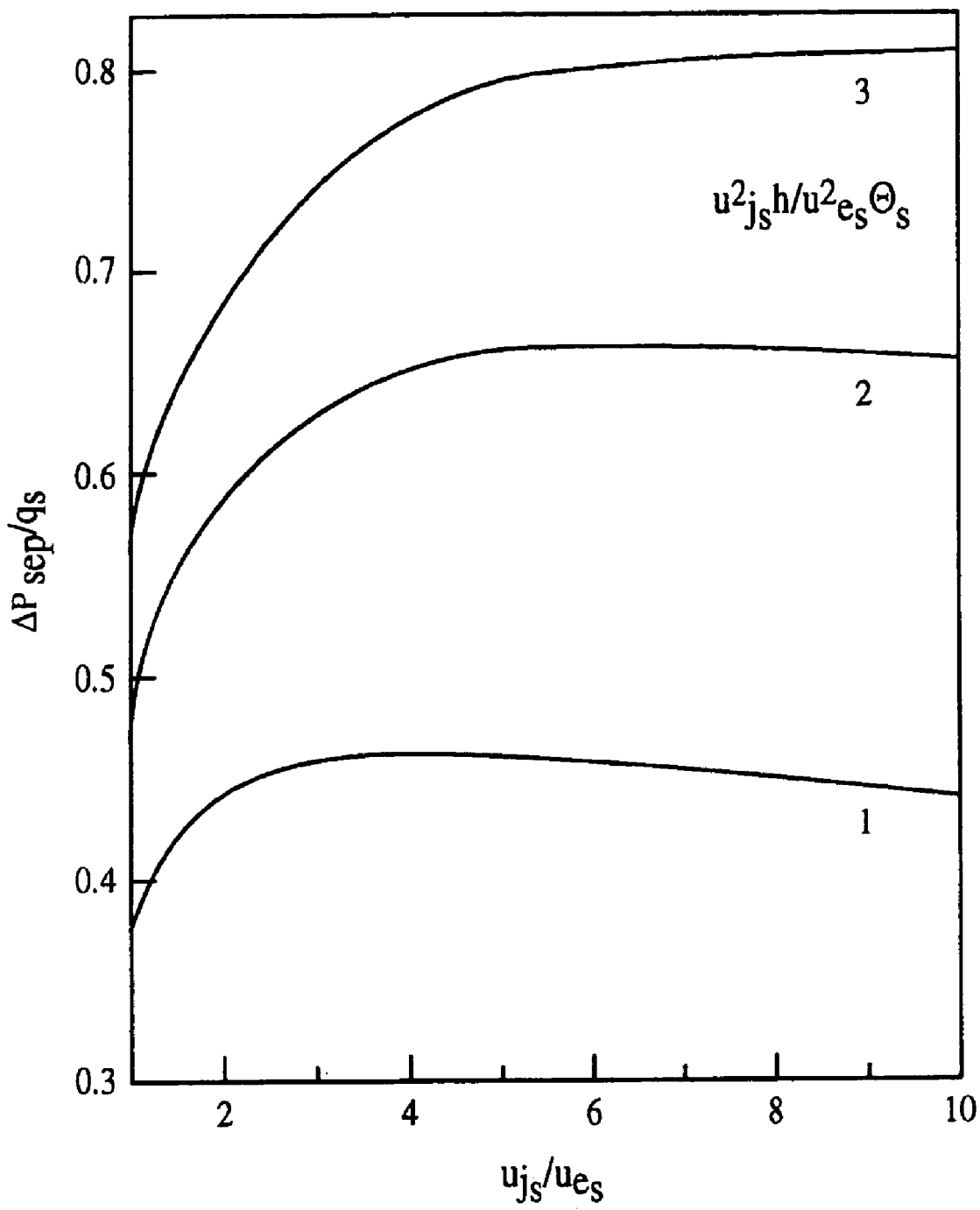
FIG. 4 is a graph of pressure rise to separation for a wall-jet in an adverse pressure gradient.

Second, the jet momentum ratio (JMR) relates the momentum of the discharge flow to the momentum missing in the boundary layer approaching the slot-nozzle location. JMR is defined by the following equation:

$$JMR = \left(\frac{U_J}{U_e}\right)_s^2 \frac{h}{\theta}$$

where: h is the gap width of the slot nozzle mouth, and θ is the momentum thickness of the boundary layer approaching the slot-nozzle location. For an examination of the influence of JMR, we refer to Hubbartt & Bangert (1970) who estimated the separation behavior of a re-energized turbulent boundary layer on a flat plate in an imposed pressure gradient. Typical results are shown in FIG. 4, where the pressure-rise to separation for given JMRs is plotted as functions of JVR. Conservatively, we have extrapolated to JMR=6 to assure survival of the discharge wall-jet in the face of a pressure rise equivalent to one velocity head (i.e., ordinate=1) of the outside flow from 90 degrees angle to the stagnation point at 180 degrees.

The third parameter, is the discharge momentum coefficient, Cμ, also known as the "momentum coefficient." The equation for Cμ is as follows:

$$C_\mu = 2\left(\frac{U_J}{U_O}\right)^2 \frac{h}{D}$$

where: Uo is the velocity of the onset current, h is the gap width of the slot-nozzle mouth, and D is the diameter of the cylinder. The momentum coefficient, Cμ, may be considered to represent the thrust coefficient of the discharging jet, the jet thrust being normalized, like a lift or drag coefficient, on the dynamic pressure of the onset flow and the diameter.

Figure 5:
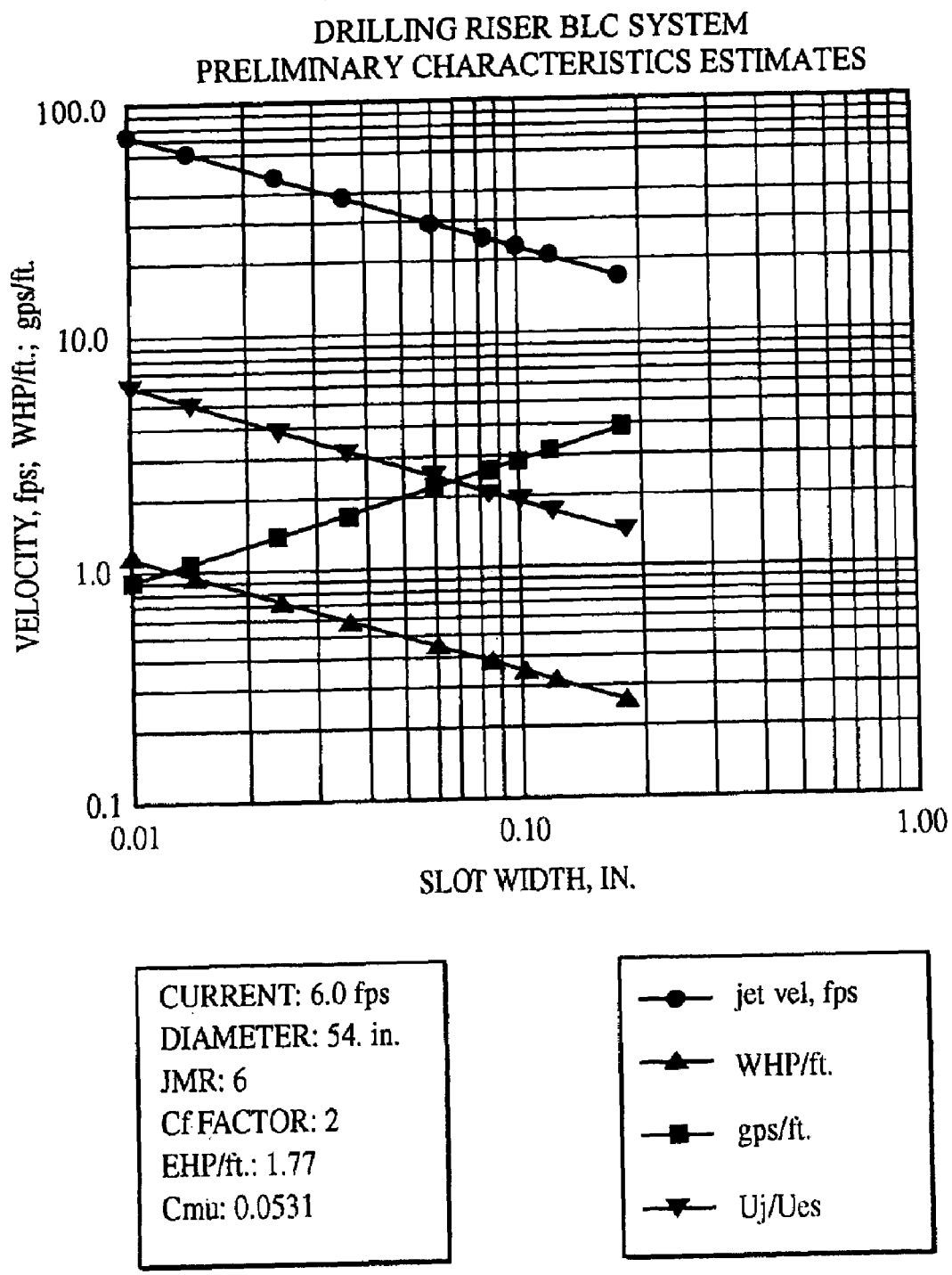
FIG. 5 is a graph showing preliminary design characteristics of a drilling riser BLC system.

Application of the above ratios, with assignment of roughness effects on skin friction, etc., results in a value of Cμ and a design chart such as that of FIG. 5. Here, several engineering parameters are plotted against the slot-nozzle gap width as a principal variable. These engineering parameters are the absolute jet velocity, the JVR, the flow rate per unit cylinder height, and the water horsepower ("WHP") per unit height. The WHP represents the product of the weight flow rate of water with the jet velocity head. With consideration for additional head losses in discharge-flow conduits, this yields the required pumping power. It is clear that the usual trade-offs are present. We can achieve low power requirements at the cost of large system volume and weight or, conversely, build a compact system at the cost of higher power requirements. However, all solution points on the chart are for a specific value of the momentum coefficient, Cμ.

The value of Cμ has been presumed chosen essentially to eliminate drag and VIV excitation where BLC is applied. If a value of Cμ smaller than this critical value is applied, it is expected that the reduction of drag and hence VIV will not be as great. If a larger than critical value is used, a small net thrust is expectable. Nevertheless, it is recognized that such tradeoffs may be acceptable in commercial systems, due to cost constraints and physical limitations.

If the two BLC slot-nozzles 210 discharge unequally, that is have differing values of Cμ, as asymmetry can be expected in the flow. This will be accompanied by a lateral lift force, perpendicular to both the cylinder axis and the current vector. This lateral lift can be very large. Similarly, misalignment of the discharging slot-nozzles 210 with the current direction can also result in asymmetry and lift.

The BLC control system of the present invention may include features that held avoid these undesirable lift situations. For example, the present invention may include apparatus for rotationally aligning the slot nozzles 210 in response to a measurement of asymmetry, such as in the pressure distribution about the cylindrical marine riser 200. Alternatively, deliberate differential discharging of the two slot-nozzles 210 may also be applied in response to asymmetry measurements. It should be recognized, however, that rotational alignment and differential discharging are not limited to applications involving a single pair of slot nozzles 210, as in FIGS. 2A and 2B. These methods for avoiding asymmetry may applied to a marine riser having any configuration of slot-nozzles and/or pinpoint-nozzles.

Demonstration Tests

Figure 6A:
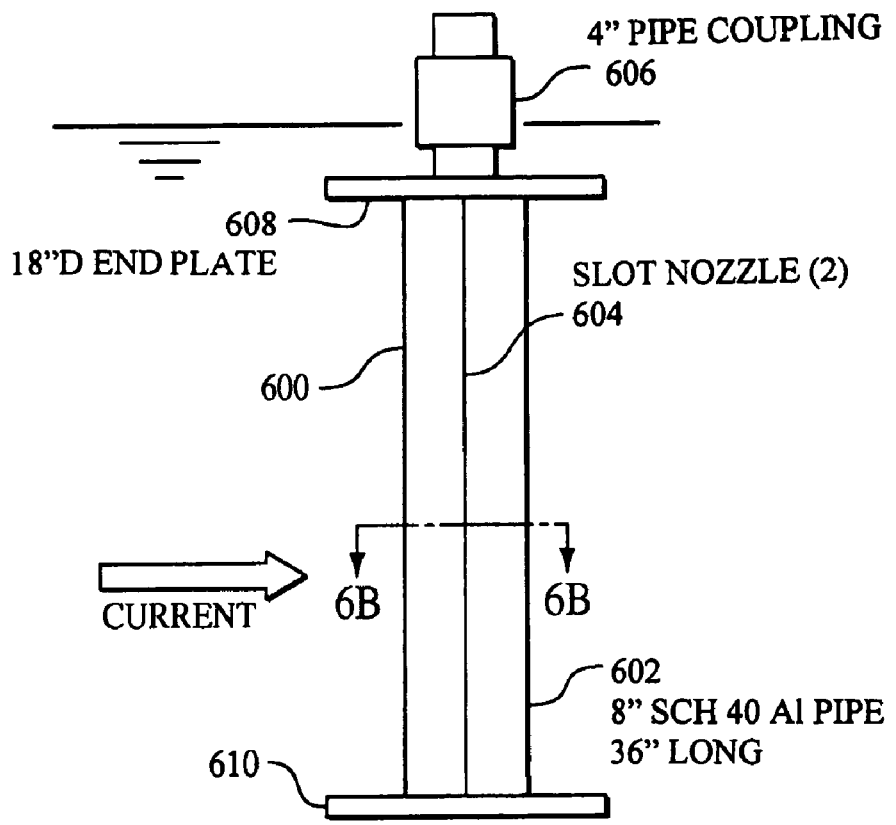
FIG. 6A is a side view of a demonstration test model of a marine drilling riser with an active BLC system in accordance with the present invention.
Figure 6B:
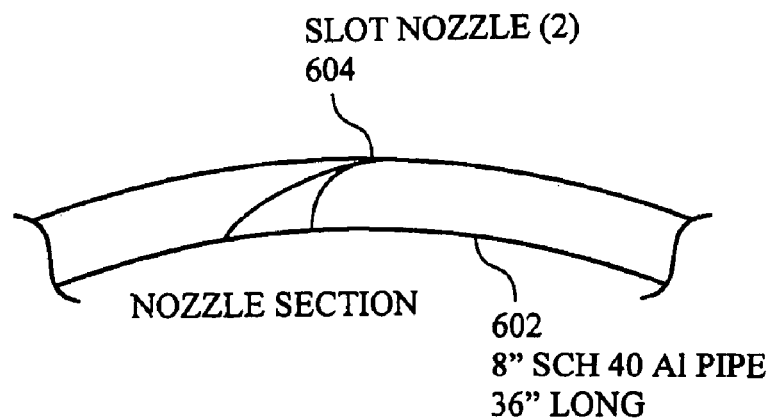
FIG. 6B is a partial top view of the demonstration test model of FIG. 6A taken along line 6B—6B.

FIG. 6A is a side view of a cylindrical model 600 that was fashioned from 8" schedule 40 aluminum pipe 602, having a length of 35 inches. Two such lengths of pipe were cut longitudinally into halves. On one half, the longitudinal edges were milled in a circular cove shape, while on another the edges were made convex. When fitted together these edges bounded a pair of slot-nozzles 604 with tangentially directed mouths located 180 degrees apart.

The pipe halves 602 were screwed to a set of internal bulkheads that were, in turn, welded to a length of perforated 4-inch aluminum pipe 606. The 4-inch pipe 606 was carried a further six feet from the cylinder 600 and thence out of the slot-nozzles 604. Pairs of "puller" and "pusher" screws (not shown) along the slot-nozzle concave lips, at the bulkheads, allowed the nozzle gap widths to be adjusted while being measured with a feeler gage.

The 36-inch cylinder was fitted with round end-plates 608, 610 of 18-inch diameter. The end-plated 608; 610 were sealed against the edges of the 8-inch pipe 602 to prevent leakage of the water being discharged from the slot-nozzles 604.

The cylinder assembly 600 was mounted to a towing carriage truss vertically. The 4-inch pipe stem was connected to the lower beam of the truss through a pair of orthogonal load cells and to the upper beam, 36" higher, through a ball-joint. The strain-gage type load cells were oriented to measure forces in the streamwise and lateral directions. The submergence of the upper end-plate 608 was adjustable to a limited extent by sliding the assembly up or down under its clamping U-bolts. The angular orientation was likewise adjustable and measured with a quadrant and pointer.

Discharge water was supplied by an available 20 horsepower centrifugal pump riding on the towing carriage. Suction was taken from the tank through a trailing pick-up pipe fitted with a foot-valve. As the pump was considerably oversized for the duty, most of its discharge was by-passed back to the tank through a throttle valve. The discharge water was passed through a strainer and throttle valve and delivered to the top of the 4-inch pipe stem via a length of fire hose. The hose provided a flexible connection, and pressure tare loads were found to be small.

A pressure gage was fitted to the top of the 4-inch pipe stem. A small vent valve was also fitted at the top of the 4-inch pipe stem to bleed off any air trapped in the column. When corrected for the elevation above the tank water level, this gage furnished the pressure of the discharge water supplied to the slot-nozzles 604. Having estimated the discharge pressure of the slot-nozzles 604, the pressure drop through the slot-nozzles 604 was determined, and hence the jet velocity and discharge flow rate.

For flow visualization, several small dye emitter ports were installed through the 8-inch pipe wall 602 at various angular locations, which ports were piped internally to hose-bibs at the upper end-plate 608. An underwater video camera allowed real time observation and recording of the flow about the cylinder as marked by the emitted dye streams.

The initial run plan matrix included slot-nozzle gap widths of 3 and 6 mils, $C\mu$ values from 0 to 0.06 in 0.01 intervals, and towing speeds of 3, 5, 7 and 10 fps. Runs were added to examine the lateral force relation to azimuth angle of the cylinder and slot-nozzle pair. As the drag force appeared low, a consequence of "drag crisis" Reynolds numbers, roughness was added and then adjusted.

Without energetic discharge of water from the slot-nozzles 604, at any towing speed, the dye streams showed full flow separation from approximately the ±90 degree locations on the cylinder. The wake was filled with diffused dye. This result was as expected.

By discharging water from the slot-nozzles 604 at low values of $C\mu$, there was an immediate reduction of the width of the separated flow region. The dye streams were seen to curve smoothly around the back of the cylinder before separating at angles greater than ±90 degrees. With increase of $C\mu$ to values of about 0.04, the separated region was seen to decrease in width to a minimum that fluctuated somewhat in position.

In order to examine the effectiveness of BLC with variation of the slot-nozzle angular location relative to the current direction, the cylinder was turned. The dye streams marking the flow were then observed on one side and behind the cylinder. With a slot-nozzle located at 80 degrees, that is 10 degrees forward of the expected non-BLC'd separation point, the flow appeared to stay attached as well as if located at 90 degrees—for $C\mu$ values of 0.04 or more. When turned to the 95 degree position, nominally under an otherwise separated flow, the BLC still appeared to work well at the higher $C\mu$ values. When the cylinder was turned to place the slot-nozzle at 105 degrees, however, the flow was seen to separate, although not so extensively as without water discharge.

When discharging symmetrically at effective values of $C\mu$, a degree of instability was observed in the dye streams where they met at the rear of the cylinder, as noted above. The angular location of the region in which the meeting dye streams departed from the cylinder varied with time and spanwise (vertical) position. The variations appeared to the eye as fairly random and uncorrelated.

Figure 7:
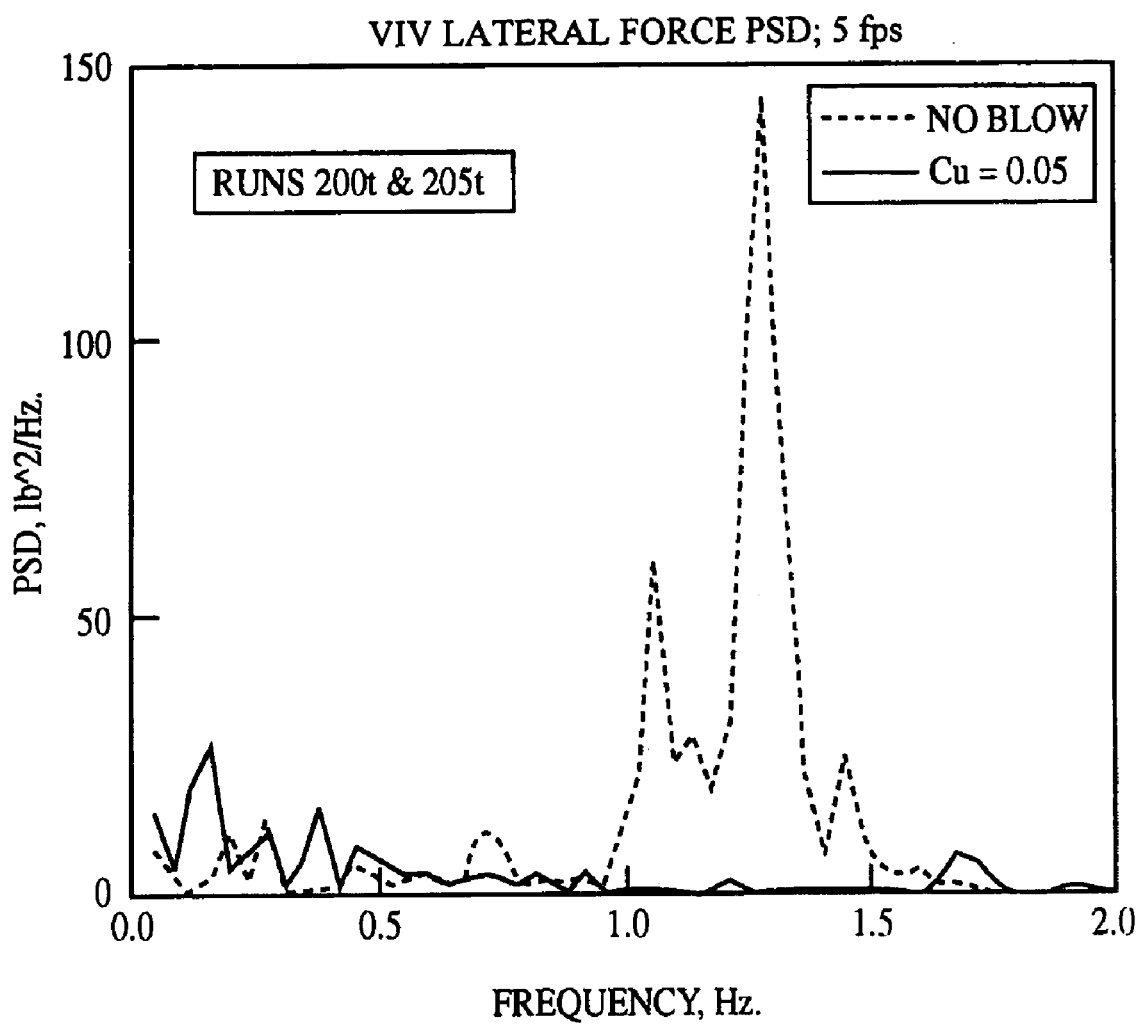
FIG. 7 is a graph of measured VIV force on the model.

Both time series and spectra of the lateral force signal showed marked reductions or outright elimination of the fluctuating forces associated with the usual range of Strouhal numbers. FIG. 7 compares lateral force spectra for $C\mu=0$ and 0.05 while moving at 5 fps.

Figure 8:
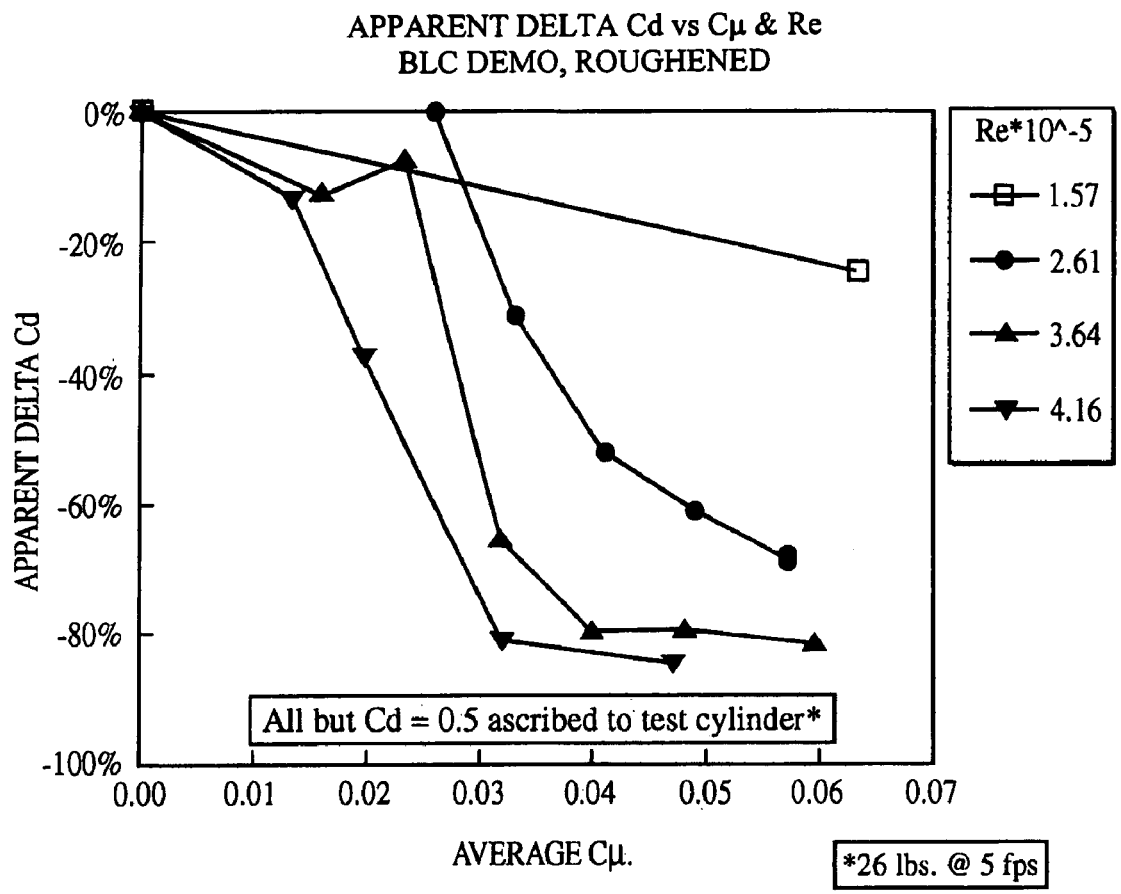
FIG. 8 is a graph showing apparent drag reduction versus "momentum coefficient" and Reynolds number.

FIG. 8 shows the drag reduction results under the assumption that all but a drag coefficient, Cd=0.5, is originally attributable to the test cylinder. While the specific allocations can be argued, the general nature of the results in more-or-less as expected. The drag coefficient decreases in an S-shaped fashion when the momentum coefficient, $C\mu$, is increased beyond a threshold value. Further, that threshold value of $C\mu$ decreases with increasing Reynolds number. There is, however, no small residual propulsive thrust apparent at high values of the momentum coefficient.

Drilling Riser BLC System

The environmental conditions and assumptions for the design are listed in the box of FIG. 5. A maximum onset water current velocity for a GOM 10 year loop current may be accommodated, taken as 3.5 knots. A 54" outside diameter of the cylindrical marine riser is assumed, with cylindrical surface roughness causing twice the local frictional drag of a hydraulically smooth surface.

With these assumptions and conditions, and with a slot-nozzle gap width of 0.06 inches, a discharge water flow rate of 130 g.p.m. may be used per foot of depth, which for 70' of treated depth amounts to about 9000 g.p.m. per joint. With a nozzle discharge velocity of 30 fps, which is 5 times the onset current velocity, the velocity head is 13 ft., yielding a total load-water-horsepower of 30 HP per joint. Allowance for 100% of the output velocity head is provided for losses in the ducting of the water suction and distribution systems. Further, a pump efficiency of 75% and a motor efficiency of 80% are assumed to arrive at a maximum input power requirement of roughly 75 KW per riser joint. With reduction of current velocity with depth, as in the GOM, the power requirements will decrease approximately as the cube of velocity.

Alternative mechanisms for discharge-water supply include: (1) rig-based pumps delivering water to the top of the riser through hoses and a pup-joint manifold; (2) riser-resident pumps taking suction and delivering discharge-water locally, powered by (a) hydraulic motors, with oil delivered and returned through stabbed pipes, (b) water turbines/motors, which delivers high pressure water through a stabbed pipe and dumped, (c) submersible electric motors powered by a stabbed 3-phase conductor set. The first mechanism, rig-based pumps and hoses, is practical for the topmost riser joint (and for rig-suspended BLC sheath systems). Riser-resident pumps allow each joint of riser to be a self-contained independent system, needing only a supply of power. The third alternative, electric-powered riser-resident pumps, provides perhaps the least invasive and lowest risk.

There are also various alternative mechanisms for effecting "steering" of the discharge slot-nozzles symmetrically to the onset current. These mechanisms include: (1) multiple slot-nozzles around the periphery of the marine riser outside diameter (e.g., FIG. 2D), selectable in pairs by valves either on a header, with individual conduits, or by slot "strip-values" entering a common annular conduit duct; (2) a rotate-able riser with one slot-nozzle pair; or (3) a rotate-able annular BLC sheath about the riser buoyancy with one slot-nozzle pair. Rotating an annular sheath containing the entire BLC system on each riser joint is an effective and cost-efficient mechanism. In this concept, the pumps, motors, duct conduits, and slot-nozzles form a single unit, rotatable about the buoyancy foam or can. Electric power will be brought from the riser to the motors via flexible cables, which of course, must have their turns counted.

The inputs to steering and pumping control are the direction and velocity of the current versus depth. Alternative mechanisms for the steering and pumping control input are: (1) riser joint circumferential pressure distribution with pattern recognition; (2) rig-resident Doppler velocimeter; or (3) remote current-meter string.

The pressure distribution about a riser joint may be sensed by a set of flush-mounted or ported pressure transducers. Their time-averaged symmetry pattern reveals the direction, and their magnitude, the velocity of the local onset current.

Various alternative mechanisms also exist for steering actuation, including: (1) motor-driven pinion shafts, rotating with the annular sheath, which engage a set of riser-fixed tooth-wheels positioned along the depth of the joint; (2) an ROV fitted with a wrench, which mates with a socket on each riser joint and cranks the sheath to the commanded azimuth angle; or (3) a passive "tail-feathers" vane or vane-effective slot jet which will cause the annulus to rotate to face the current when supported on low-friction bearings.

Both active electro-mechanical means and passive hydrodynamic means for rotating the annular BLC sheath are described in detail below.

Figure 9A:
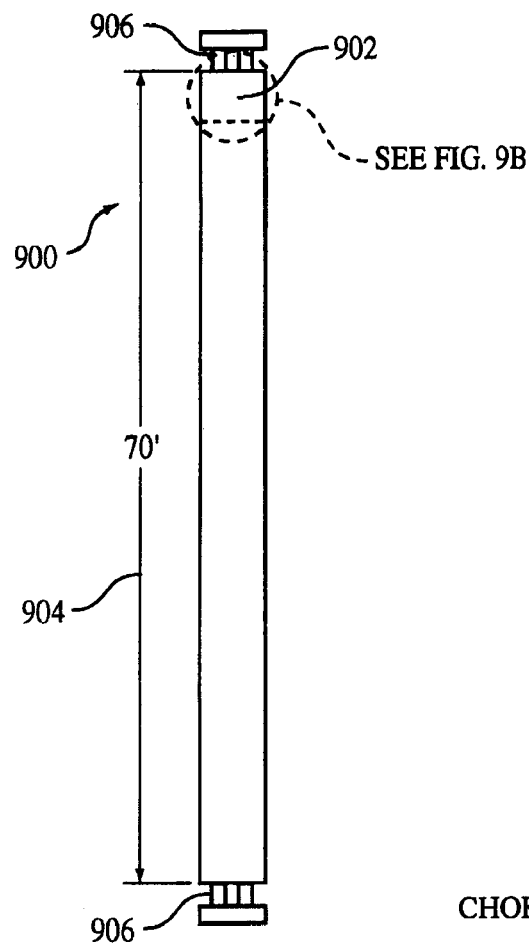
FIG. 9A is a side view of a marine riser joint with self-contained BLC system in accordance with the present invention.
Figure 9B:
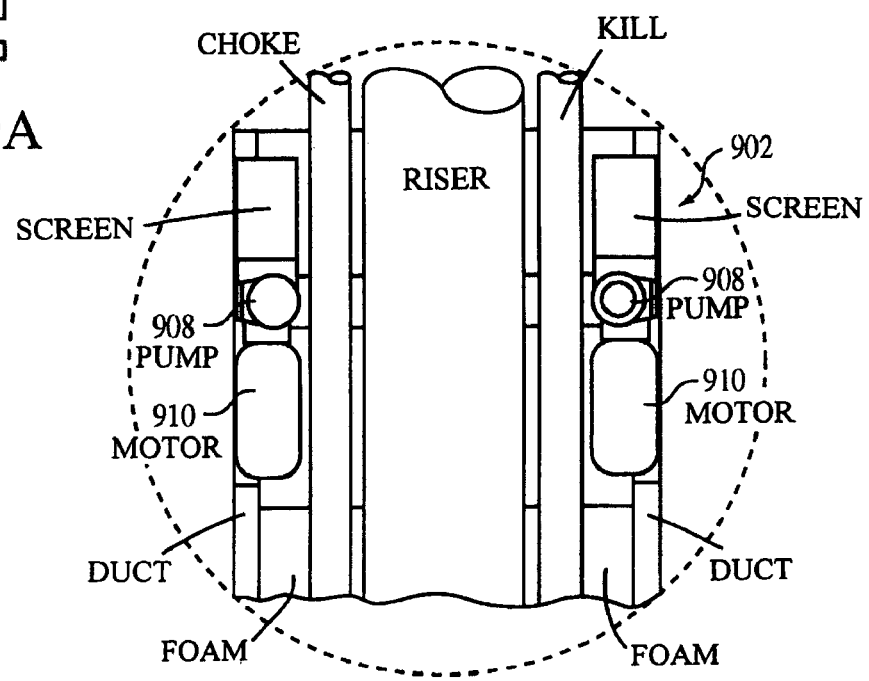
FIG. 9B is a blown-up cutaway view of the marine riser joint of FIG. 9A.

A feasible arrangement of a riser-resident, rotate-able, electrically powered, pumped BLC system 900 is shown in FIGS. 9A, 9B, 10, and 11. In FIG. 9A, the rotating machinery occupies a height of about five feet near the top end of the joint, as indicated FIG. 9B, which shows the rotating machinery 902. A length (depth) of 70 feet over which active BLC will be applied has been assumed in FIG. 9A. An untreated space 906 of about 1.5 feet is left open at each end for access to the bolted coupling flanges and for the entrance of the discharge water to the pump suctions.

Figure 10:
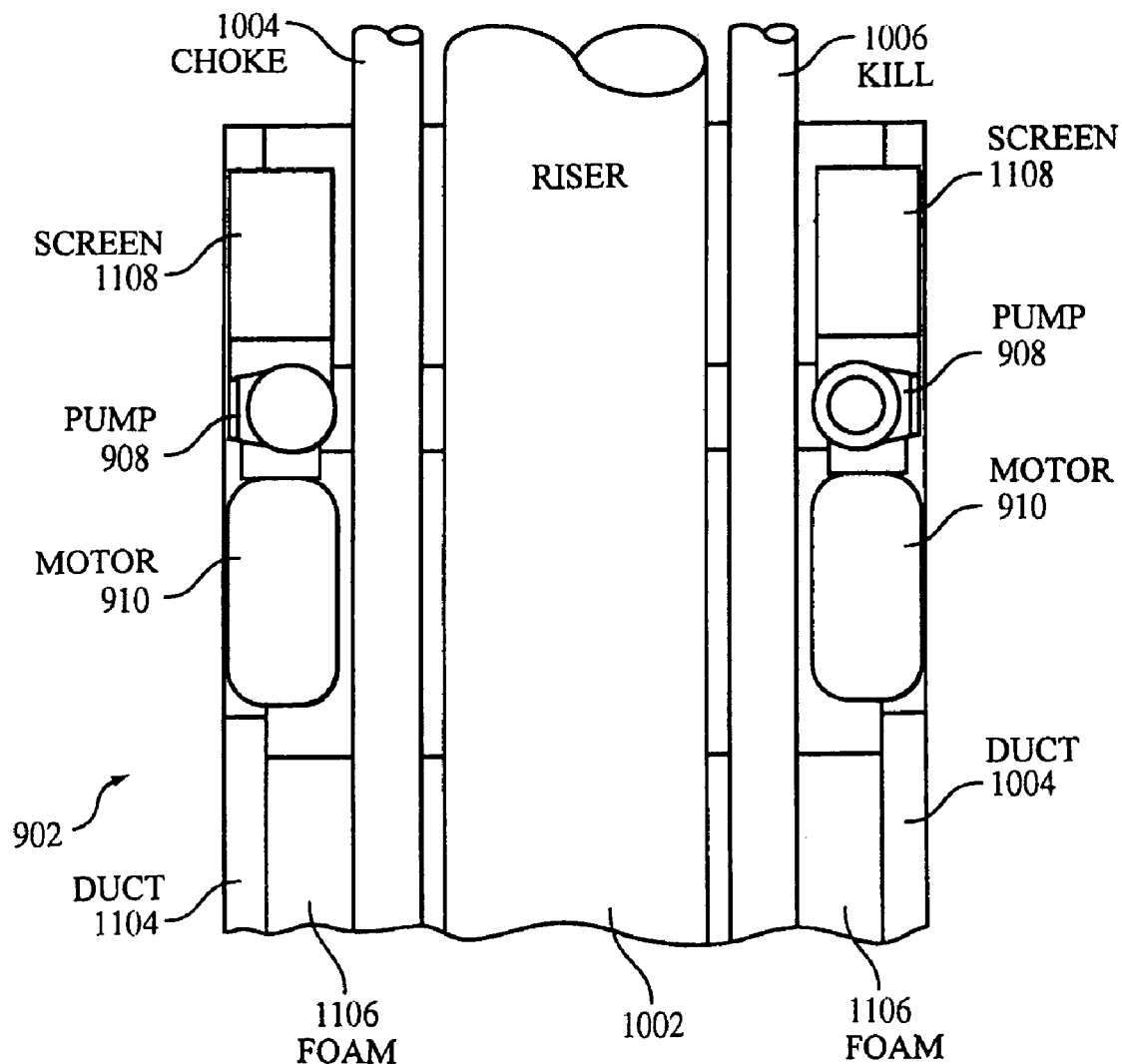
FIG. 10 is a centerline sectional view of exemplary BLC equipment at the top of the marine riser joint of FIG. 9A.
Figure 11:
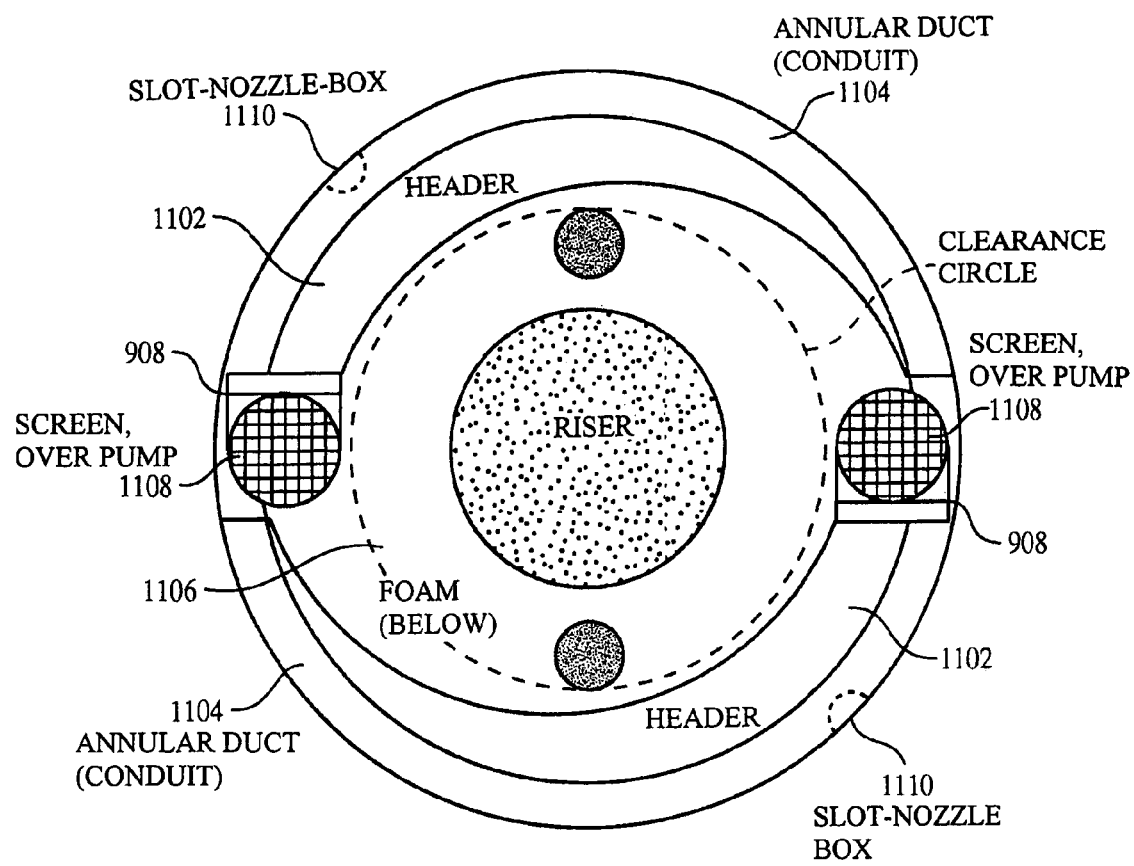
FIG. 11 is a view looking downward at the inlet level on the marine riser of FIGS. 9A, 9B and 10 having exemplary BLC equipment.

As shown in FIGS. 9A and 10, the rotating machinery portion 902 of the marine riser 900 includes a central riser conduit 1002 for carrying, for example, oil being pumped from the ocean floor. Space for choke and kill conduits 1004 and 1006, respectively, will be provided to control gas coming out of the earth during drilling. The pumps 908 may be low-head, high volume propeller types with a designed specific speed of 20,000 (English units). The motors 910 may be oil filled units operating at 3600 RPM and delivering 40 HP each. These motors 910 may be 8 inches in diameter and approximately 36 inches long. Such motors have been tested to 5000 feet depth, as evidence by motors commercially available from Franklin Electric. As shown in FIGS. 10 and 11, each pump 908 discharges to a header 1102 that feeds a nominal 180-degree sector of annulus 1104 that may have a 3" radial width. The annulus duct 1104 on each side may decrease linearly with depth to nearly zero at the bottom of the active surface. This reduction of duct cross-section with depth on a given riser joint provides a constant downward velocity of the discharge-water—at about one-fifth of the jet discharge velocity. Annulus volume liberated by the duct taper can be foam filled 1106 to regain about one-half of the lost buoyancy of the annulus, and to provide some structural stiffness.

Variable frequency motor controllers (not shown), housed in pressure vessels, may accompany the motors 910. By providing individual pump-motor control, residual lateral lift forces, as detected by a pressure sensor system, may be minimized. A cross-connection may be provided between pump discharges to allow one pump to power both slot-nozzles 1110 in the event of a failure. Further, a valving arrangement may be included to allow periodic back flushing of the suction screens 1108.

Annulus Turning Gear for Marine Riser

Figure 12A:
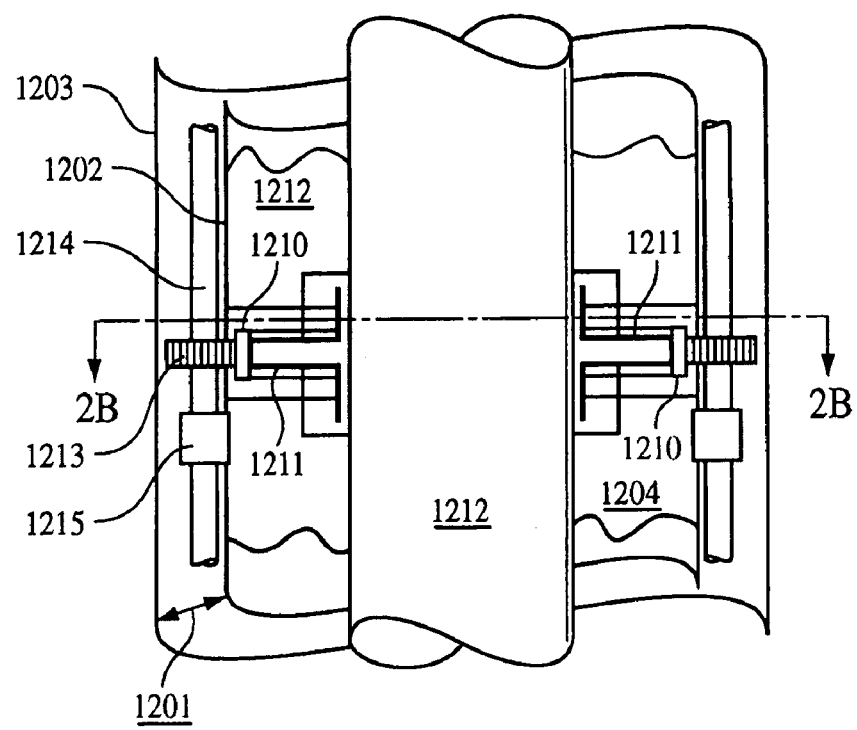
FIG. 12A is a partial centerline-vertical section of a marine riser with an electro-mechanical BLC annulus rotator.
Figure 12B:
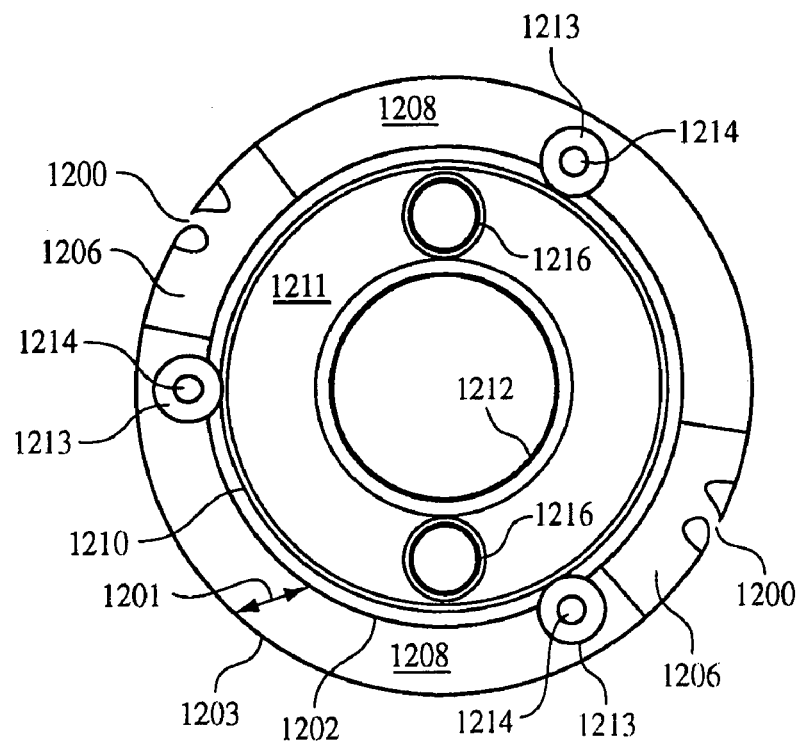
FIG. 12B is a horizontal-section view of BLC annulus rotator equipment of FIG. 12A along line 12B—12B.

FIG. 12 shows an exemplary mechanism for controlled turning of a BLC annulus to steer a pair of discharge slot-nozzles 1200 into the direction of an onset current. In this example, the BLC annulus structure 1201 includes an inner tube 1202 and an outer tube 1203, the latter surrounding the riser's buoyancy module 1204. The annulus tube-walls 1202, 1203 may contain a pair of vertically oriented discharge-water supply conduits 1206 as well as their associated slot-nozzles 1200. The conduits, which may decrease in cross-sectional area with depth-wise position, are separated by annular volumes of buoyant syntactic foam fill 1208. This tubular structure may be radially and axially (vertically) supported and constrained by a number (for example, two or more per joint) of ring-gears 1210, which may be, in turn, supported by circular structural bulkheads 1211 that may land centrally upon the riser pipe 1212. A set of (for example, three or more per ring-gear) pinion gears 1213 may be used to mesh with each ring-gear 1210 and provide rotational freedom for the BLC annulus structure. Each such pinion may be attached to a vertical shaft 1214 supported within the BLC annulus by a set of bearings 1215. In this embodiment, the bearings 1215 are of anti-friction plastic design and benefit from water lubrication, and the shafts 1214 extend vertically, generally upward, to (preferably) an equal number of gear-motors (not shown) located in a machinery space of the BLC riser joint. This machinery space, which may also contain the BLC discharge-water supply pumps and motors, discharge headers, and inlet screens, may be generally located at the top of the riser joint that it serves.

In this embodiment, under computer (or manual) command, informed by separate information on onset current direction and strength, the set of gear-motors, preferably operating simultaneously and in parallel, rotate the set of driven shafts 1214 and their attached pinion gears 1213. This results in a controlled rotation of the entire BLC annulus structure 1201 about a vertical axis coincident with that of the fixed riser joint 1212.

Since welding to a riser pipe 1212 is generally forbidden, the circular bulkheads 1211 and supported ring-gears 1210 may be made in halves, with the halves bolted together around the riser pipe and made fast to it by bolted band clamps. These bulkheads 1211 may be notched to provide clear passage to the choke and kill lines 1216 and any other tubular accessory lines (not shown) that may be included parallel to the main riser pipe 1212. The syntactic foam buoyancy material 1204, which may be used to fill the void space between the riser pipe 1212 and the BLC annulus structure 1201, is preferably cut and configured to avoid interference with these bulkheads 1211 as well as the other structures.

It will be noted that, preferably, all BLC machinery is mounted to and upon the BLC annulus structure 1201 and rotates about the fixed riser structure 1212, 1204 with the BLC annulus structure 1201, under the control of the steering computer or operator.

As an alternative, a plurality of motors may be used in the manner of one at each pinion gear 1213. In this case, the parallel and simultaneous operation of these motors would be ensured by electrical means and the shafting would be eliminated. In either case, the motors may be sealed, oil-filled, pressure compensated, A/C or brushless D/C types capable of operating dependably in the ocean at substantial depths.

The rotation motors may be powered via cables that connect mains on the fixed riser to those motors that reside on the rotate-able BLC annulus structure 1201. In such an embodiment, those cables will be allowed to coil about the riser in an annular space reserved for that purpose. If a steering control computer is used, it may be used to monitor the coil count of the cables at all times and to perform such unwinding rotations of the BLC annulus 1201 as are necessary to avoid exceeding the allowable number of wraps in either clockwise or counter-clockwise directions.

BLC Riser Tail-Jet

Figure 13:
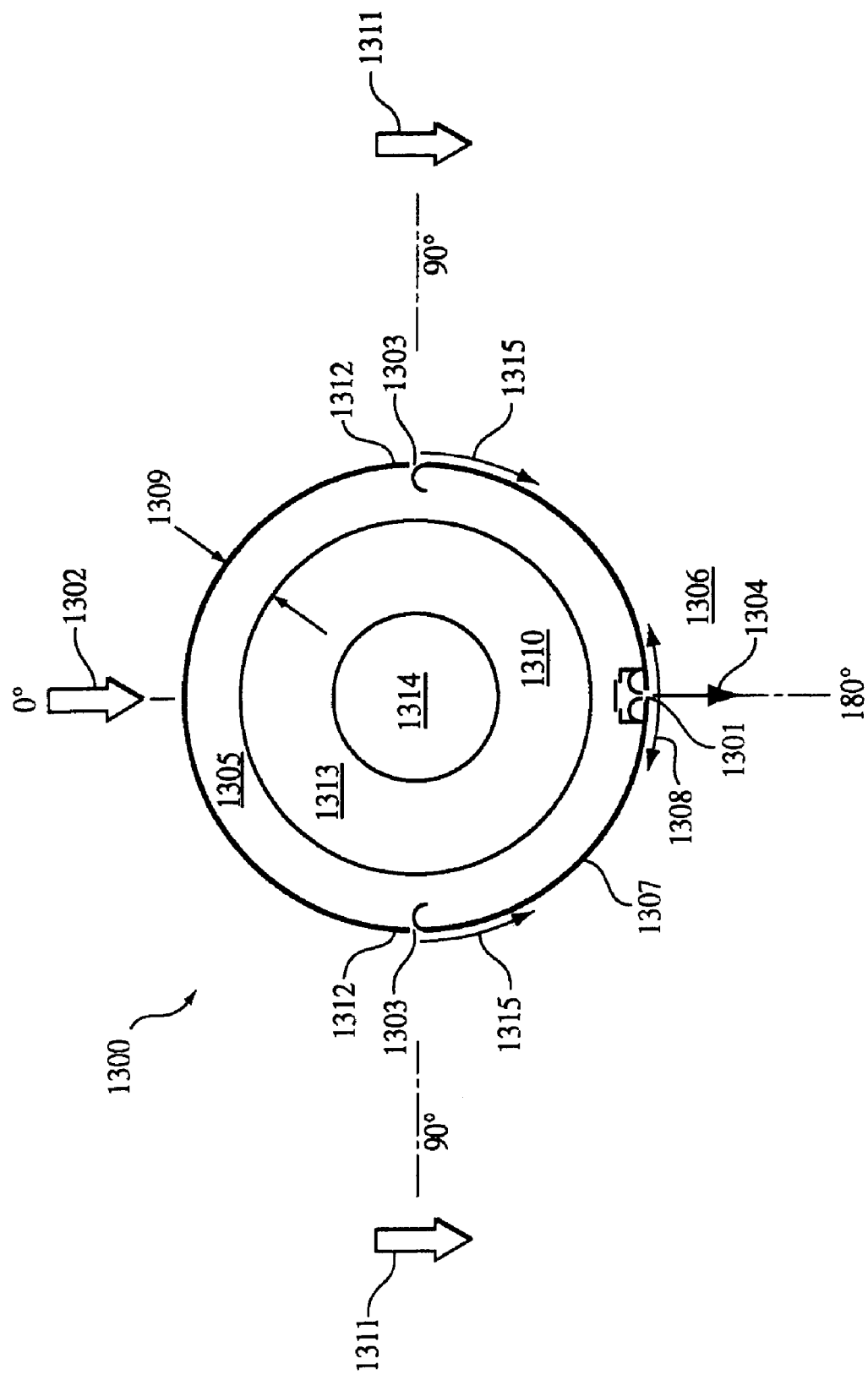
FIG. 13 is a horizontal section through a BLC riser with a tail-jet.

FIG. 13 shows an example of an active BLC tail-jet for a marine drilling riser 1200. In this embodiment, a slot-nozzle 1301 is located at 180-degrees relative to the onset current 1302 and 90 degrees or more from the BLC wall-jets' slot-nozzles 1303. The 180° nozzle 1301 discharges a "tail-jet" 1304 in a substantially radial direction, unlike the BLC slot-nozzles 1303, which discharge substantially tangentially to the respective surrounding exterior riser surface and substantially parallel to the exterior flow 1311, as indicated by the two downward facing vectors 1315 extending from the slot-nozzles 1303. The 180° nozzle 1301 that generates the tail-jet 1304 may have a discharge slot gap width comparable to that of each of the BLC slot-nozzles 1303. Considering that the source pressure of annulus 1305 is substantially the same for the tail-jet 1304 and the BLC wall-jets 1315, but that the back pressure for the tail-jet 1304 discharge region may be somewhat higher than that of the BLC wall-jets 1315, the velocity of the tail-jet 1304 may be smaller than that of the BLC wall-jets 1315. If the discharge slot gap width of the tail-jet 1304 is the same as that of the BLC wall-jets 1315, the tail-jet's momentum will then also be somewhat smaller. If usage finds that greater tail-jet momentum is desirable, those skilled in the art will recognize that the slot gap width of 180° nozzle 1301 may be increased accordingly.

Experimentation has shown that, while the energizing action of the BLC wall-jets 1315 may keep the flow attached to the surface of a circular cylinder 1307, the flow on the after (down current) side 1306 of the marine riser 1300 may still be somewhat unstable. This instability appears as a small random oscillation of the line of stagnation in a lateral or tangential direction 1308 about its mean 180° position. These oscillations appear to be poorly correlated over the axial lengthwise (depth) dimension of the cylinder 1300.

It is expected that the fluctuating local circulation flow about the cylinder 1300, which is associated with the oscillations 1308 of the rear stagnation line, will result in a measure of induced drag. The tail-jet 1304 may be used, in combination with wall-jets 1315, to stabilize the attached after-body flow and thereby lessen drag on the exterior of a circular cylindrical riser 1300 to a greater degree than may be achieved by the wall-jets 1315 alone.

The tail-jet 1304, by means of its radial momentum, provides the function of a fixed, radial-axial fin located at 180°. As those skilled in the art will appreciate, that function is to regulate the location of the stagnation line at 180° in face of the fluctuating inequalities of the total head of the two BLC wall-jets 1315 approaching the 180° position from left and right. This regulation is equivalent to the provision of a Kutta condition at the 180° line, analogous to that at the sharp trailing edge of an airfoil. Alternatively, instead of using the tail-jet 1304, a physical fin may be fitted at the 180° axial line. Preferably, this fin is a radial-axial, thin fin fitted at the 180-degree axial line.

A further function of the tail-jet 1304 is to provide the effect of a physical tail-fin that promotes passive "weathervane" alignment of the rotate-able annulus sheath 1309 to the local current vector 1302. The annular sheath 1309 surrounds buoyancy material 1313, which in turn surrounds the riser pipe 1314. By its action of simulating the effect of a physical tail-fin, the tail-jet 1304 applies a torque to the annular sheath 1309 tending to place the tail-jet 1304 in line with, and 180 degrees away from, the onset current vector 1302. A strip valve 1310 may be interposed between the annular conduit 1305 and the tail-jet slot-nozzle 1301, such that the tail-jet 1304 may be activated in order to commence weather-vaning and may be shut off to conserve power when alignment has been achieved. Furthermore, by throttling through the strip-valve when partially open, the momentum of the tail-jet 1304 may be controlled at less than the full open values, when this proves adequate for either rotation of the annulus or flow stabilization.

BLC Riser Tail-Fin

Figure 14A:
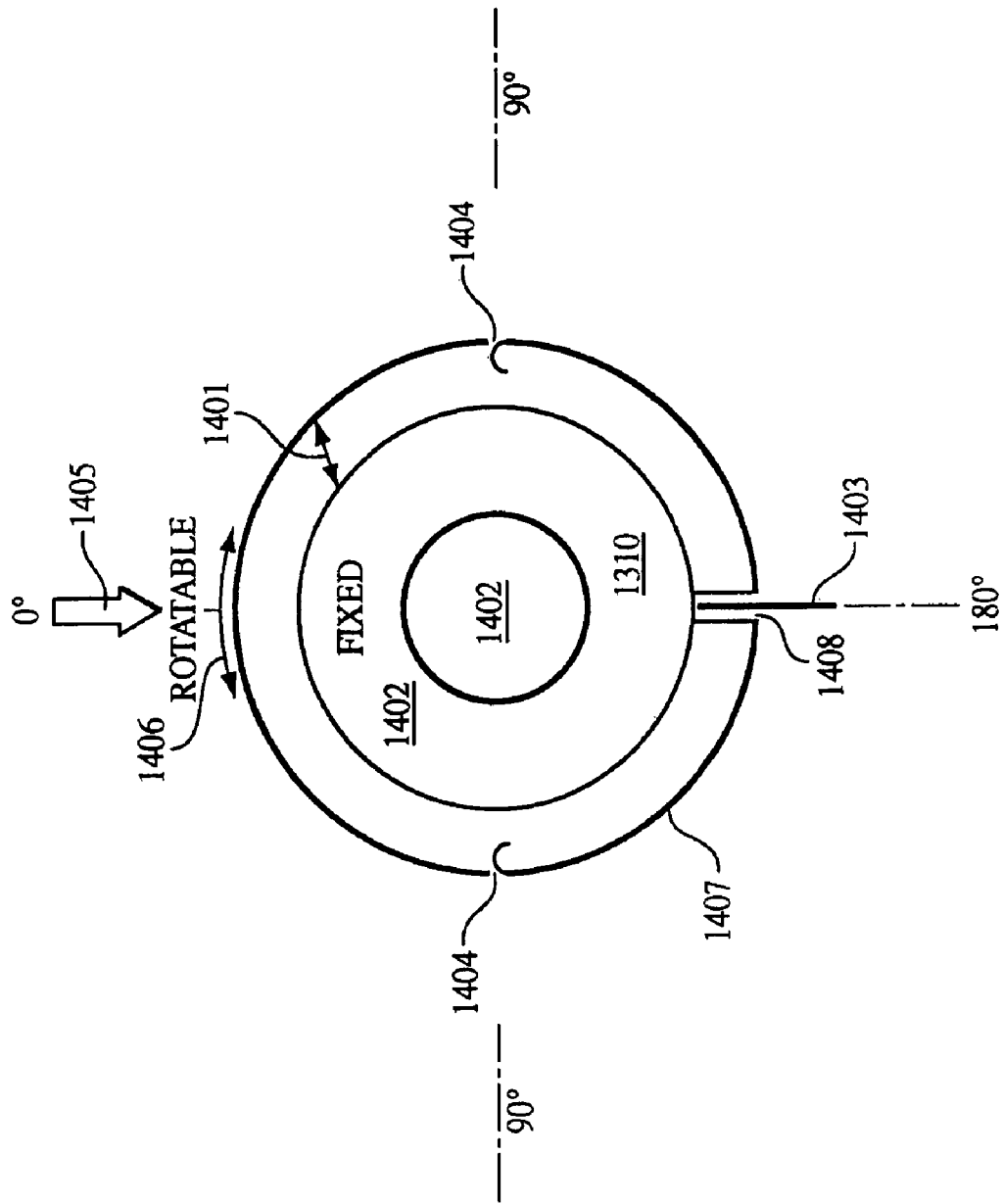
FIG. 14A is a horizontal section through a BLC riser with a folding tail-fin for riser BLC applications.

FIG. 14A is a cross section of a marine riser having a foldable tail-fin 1403 for BLC.

The purpose of tail-fin 1403 is at least two-fold. First, if the BLC surface or annulus 1401 is rotate-able relative to a fixed underlying "hull," such as marine riser or a SPAR vessel (to name two extremes of size), then the tail-fin 1403 may act as "tail feathers" and cause the BLC surface to passively rotate to align the fin with the current direction 1405. This behavior would allow the BLC surface 1407 to be equipped with but one pair (as shown in FIG. 14), or at most a few pairs, of discharge slot-nozzles 1404. Such pairs of slot-nozzles 1404 may be located at or near a diameter of the circularly-cylindrical BLC surface 1407, which diameter lies perpendicular to the streamwise plane of the tail-fin 1403. Second, any instability occurring in the flow at the rear of the riser cylinder will be suppressed by the tail-fin 1403.

The purpose of the fold-ability or retract-ability of the tail-fin 1403 fin into a slot 1408 below or inside the contiguous BLC surface 1407 is to remove it from interference with the normal operation of running and retrieving marine riser joints that are equipped with the BLC drag and VIV avoidance treatment. Additionally, by being housed in the slot 1408, the tail-fin 1403 may be protected from wave action when located at, or passing through, the air-sea interface.

Figure 14B:
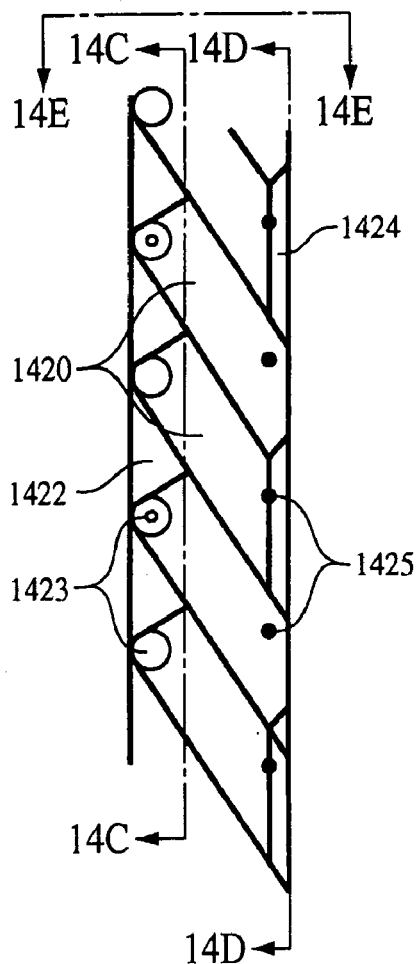
FIG. 14B is a plate-type folding tail-fin.
Figures 14C, 14D:
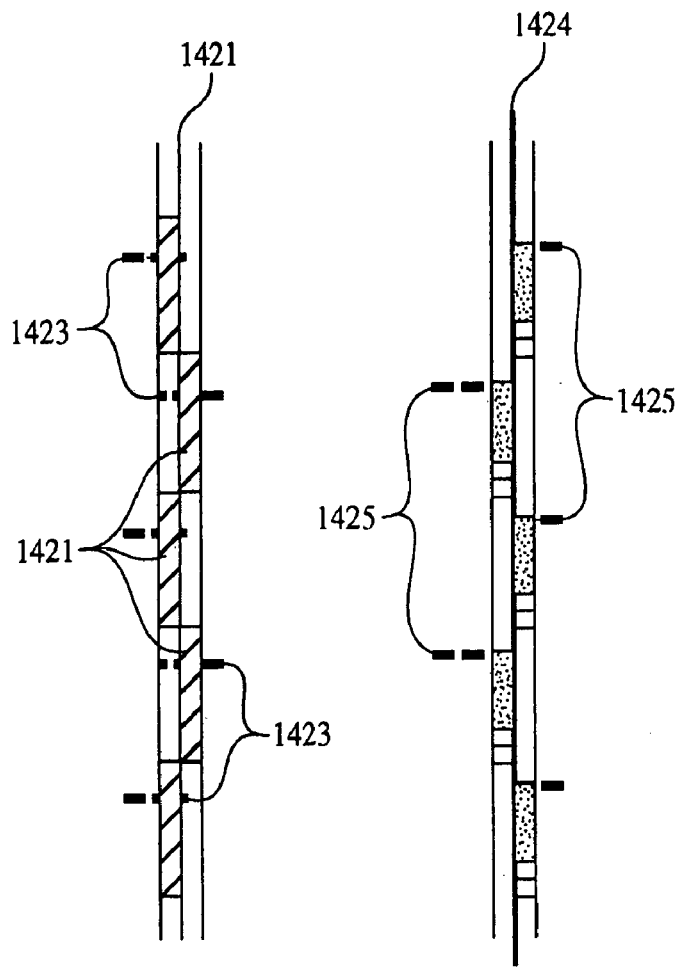
FIG. 14C is a sectional view along line 14C—14C of FIG. 14B.
FIG. 14D is a sectional view along line 14D—14D of FIG. 14B.
Figure 14E:
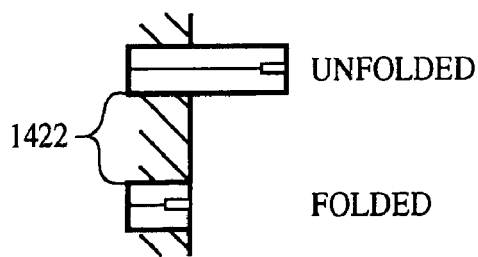
FIG. 14E is a top view along line 14E—14E of FIG. 14B showing the tail-fin folded and unfolded.

FIG. 14B shows an exemplary embodiment of the tail-fin 1403 of FIG. 14A. A multiplicity of pivoted plates 1420 are located alternately left and right of the vertical (axial)-radial center plane 1421 of a slot 1422 whose width may be nominally twice that of the plates' thickness. Pivot-axles 1423 allow rotational folding of the plates into or out of the slot, in the plane of the slot. A thin bar passes 1424 longitudinally between the outer extremities of the plates and may be pinned 1425 to each with rotational freedom, enabling the plates fold in unison into or out of the slot.

Figure 14F:
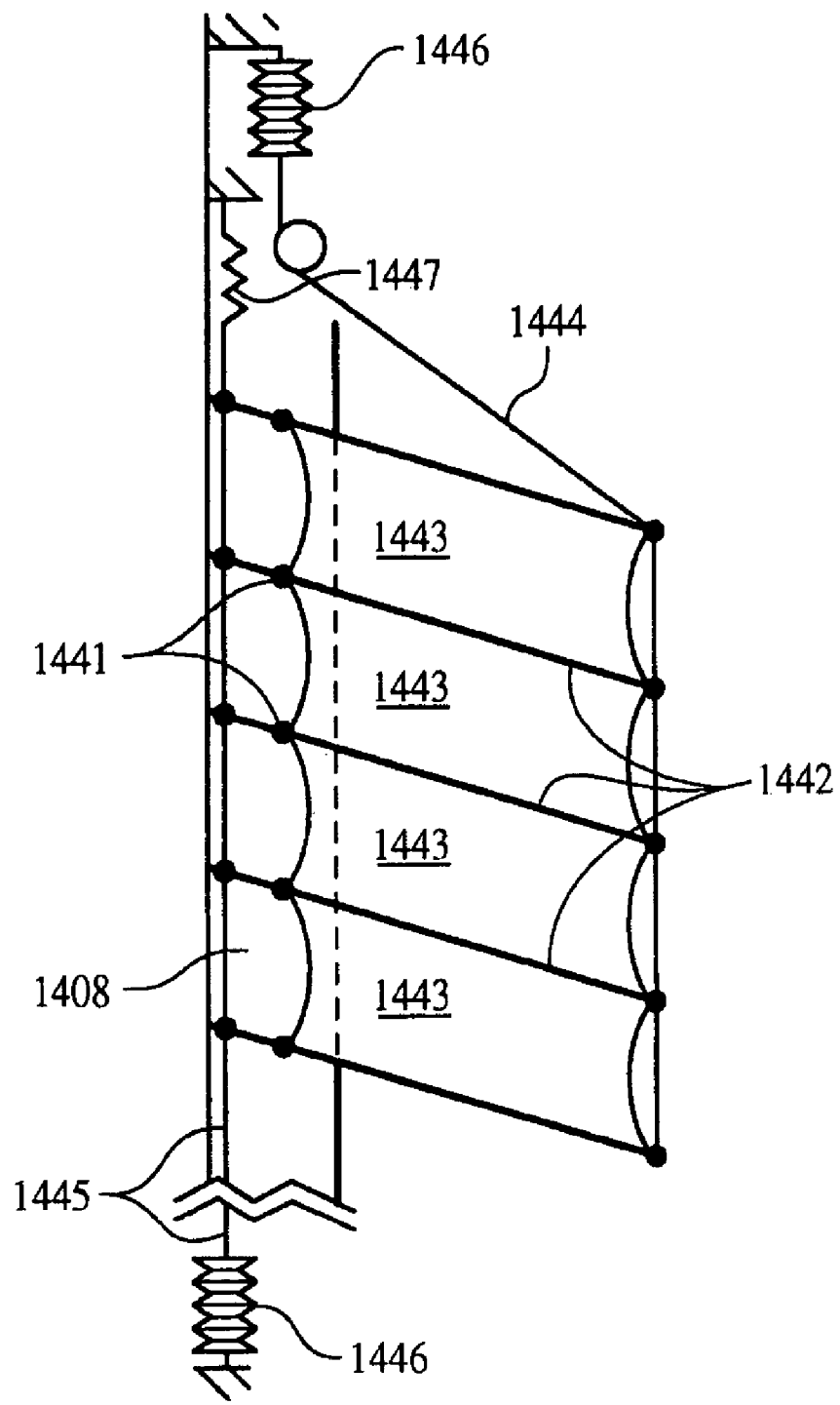
FIG. 14F is a biomimitec folding tail-fin with exemplary deployment and retractions means.

FIG. 14F shows an alternative configuration for a folding fin, a biomimetic fish's dorsal fin consisting of a multiplicity of "rays" or spines 1442, pinned at the bottom of a longitudinal slot to enable their rotation about the pins 1441 in the dorsal plane. These spines 1442 are interconnected by a continuous sheet of flexible material forming a membrane 1443 between them. When erected, the membrane 1443 between spines 1442 assumes a taut configuration; whereas when the spines are pivoted to the folded position within the slot 1408, the membrane also folds to occupy little volume. The membrane may be made of a woven fabric, a flexible fiber-reinforced plastic composite, or a thin sheet of flexible plastic material, sufficiently strong to resist hydrodynamic loads that may be encountered when deployed in an ocean current environment.

The spines 1442 and connected membrane 1443 may be erected by the longitudinal traction of a cable 1444 or thin bar which connects their outer (distal) tips. Alternatively, the traction cable or bar 1445, may be located inboard of the spine pivots, at the bottom of the stowage slot.

When deep enough to avoid serious wave motion, the fin may be remotely deployed on command, or, preferably, by hydraulic action using submergence depth pressure. Similarly, when riser is being retrieved, the fin may be furled or retracted by means of the reduction of submergence pressure when the sea surface is approached from below.

Submergence pressure may be enlisted to open or deploy the biomimetic fin by acting on a piston that is reliably sealed by means of a metal bellows 1446. The bellows 1446 will also act as a spring that assists the inward motion of the piston under submergence pressure. An opposing resisting spring and pre-load outward force will be provided by compressed air in the cylinder volume on the dry side of the piston, opposite to the seawater. When the submergence pressure plus the bellows spring 1446 provides an inward force on the piston that equals and then exceeds the outward force of the air pressure pre-load, the piston will move inward. As the submergence depth and hence the pressure is increased with further deployment (running) of the riser, the piston will move still further inward while pulling on the traction cable or bar, and by this means erecting or deploying the fin. When the fin is pre-determinedly fully deployed or erect, the piston will come to rest against a firm stop interior to the cylinder 1446, by means of which further traction motion and fin erection with further increase in depth will be prevented.

When the riser is retrieved, the process is reversed. Upon nearing the sea surface from below, the submergence pressure is reduced to the extent that the outward-directed force of the compressed air in the cylinder exceeds the inward-directed force of that submergence pressure, moving the piston outward and, by means of an opposing spring-loaded traction cable or bar 1447, folds the fin into the slot and holds it there.

The use of compressed air in the cylinder allows the deployment/furling system to be readily tested on deck. By venting the cylinder's compressed air, the spring force of the metal bellows will force the piston inward, causing the fin to deploy. Replenishing the compressed air will cause the fin to retract or furl into the slot. The magnitude of the charged air pressure will determine the depth at which the fin will begin to deploy.

Telescoping Riser-Protective Sheath with Boundary Layer Control (BLC)

FIG. 15 shows a telescoping BLC sheath 1501 that may be used to protect a marine riser 1500, while the riser 1500 is being run (deployed) or retrieved as well as during drilling operations, against surface current-induced drag and VIV. As shown in FIGS. 15A and 15C, the riser 1500 includes an inner riser pipe 1519 for conducting drill pipe or other matter from the ocean floor (not shown) up to a drilling platform 1506 from which the riser 1500 has been deployed. As shown in FIGS. 15C and 15D, the riser 1500 also may include a buoyancy foam section (or modules) 1508 around the riser pipe 1519, annular space 1509 surrounding the buoyancy foam modules 1508 for conducting discharge water down along the riser 1500, and a telescoping BLC sheath 1501 surrounding the annular discharge water space 1509.

In an exemplary embodiment, the telescoping BLC sheath 1501, when fully extended, may be implemented so as extend from the underside of the drilling floor of the floating vessel 1506 to a depth of 200 feet, more or less, to accommodate the strong "loop" currents of the Gulf of Mexico ("GOM"). Those skilled in the art will recognize, however, that this GOM embodiment is only exemplary, and that the telescoping BLC sheath 1501 may be extended to any marine riser or even other bluff bodies used in marine applications, such as SPARs and other drilling platforms.

Figure 15A:
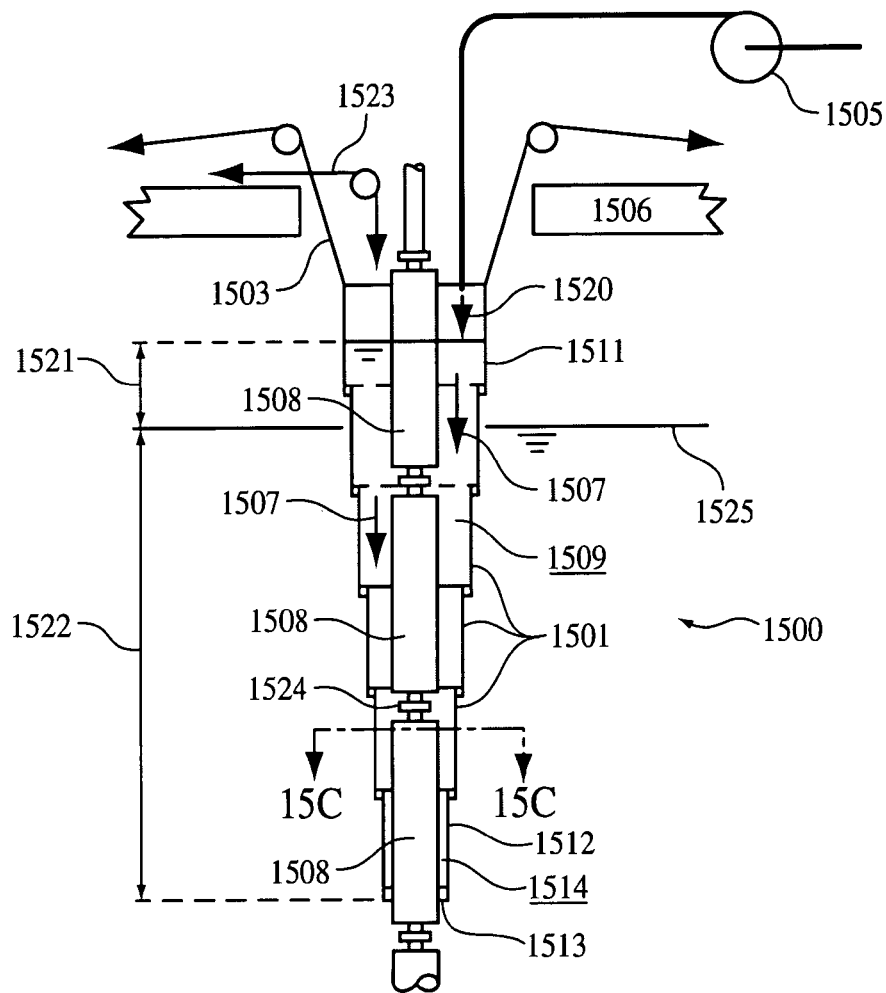
FIG. 15A is a drilling riser BLC telescoping sheath, vertical-centerline section.
Figure 15B:
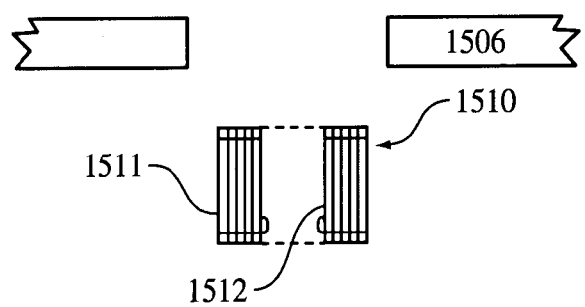
FIG. 15B shows the telescoping BLC sheath of FIG. 15A in fully nested position.
Figure 15C:
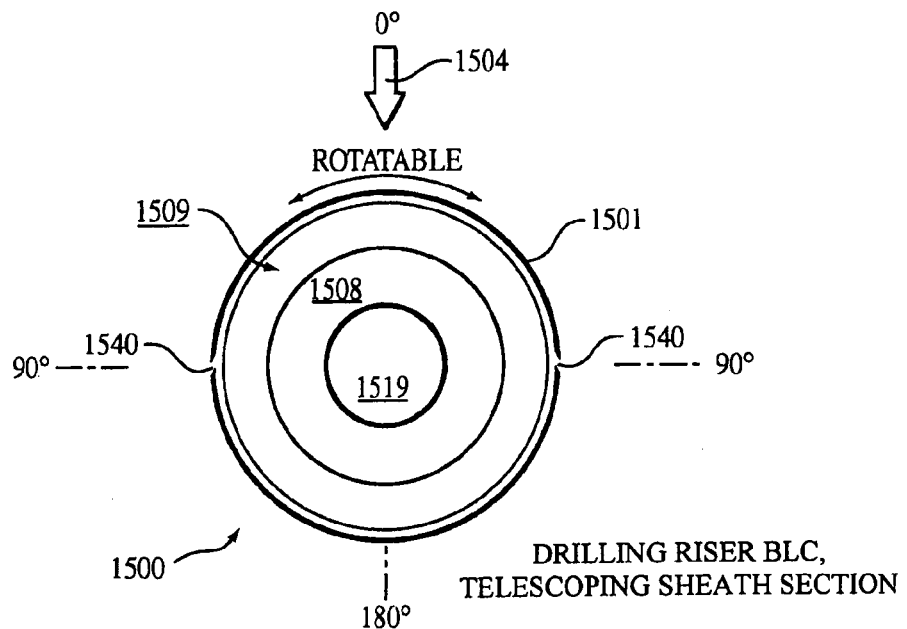
FIG. 15C is a horizontal section of FIG. 15A along line 15C—15C.
Figure 15D:
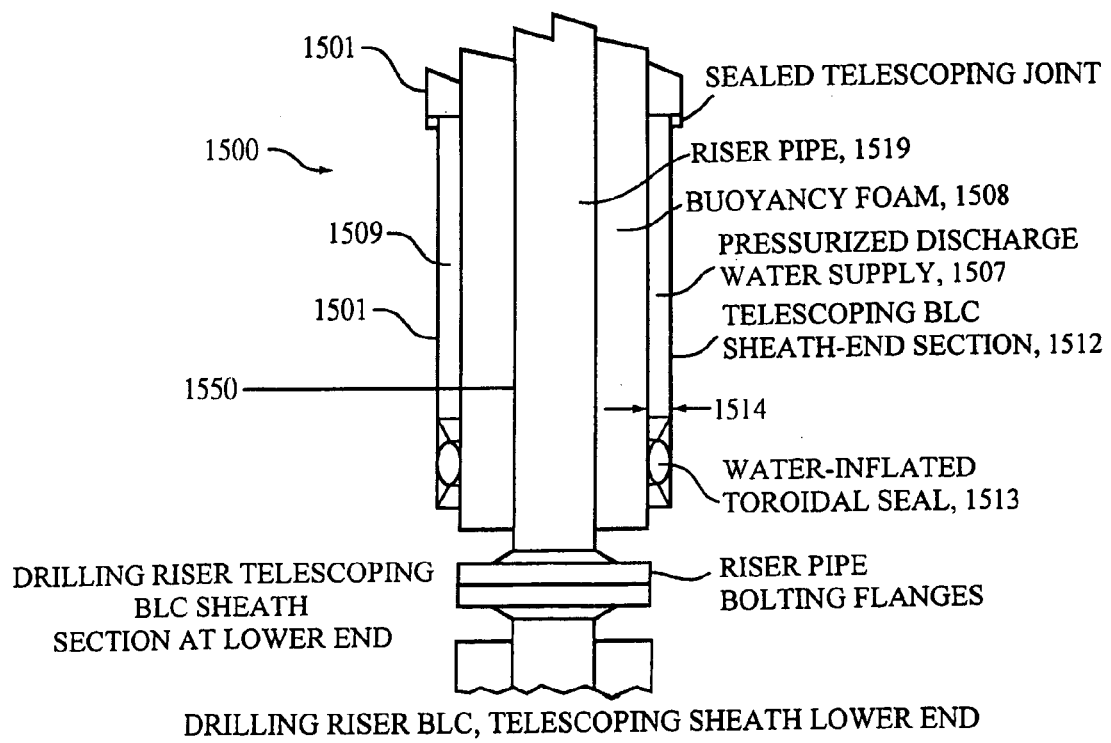
FIG. 15D is a cut-away side view of the bottom of the BLC sheath of FIG. 15A.

As shown in FIG. 15C, each cylindrical section of the telescopic BLC sheath 1501 may be fitted with a pair of tangentially discharging slot-nozzles 1540, which may be continuous over its vertical depth. Those skilled in the art, however, will recognize that other configurations of slot-nozzles and pinpoint nozzles may be employed, as explained above with reference to FIG. 2. From a station at its upper end 1511, the BLC sheath 1501 is suspended 1503 below the drill floor and may be mechanically rotated to align the axes of the discharge slot-nozzles 1540 with the direction of the onset current 1504.

As shown in FIG. 15A, BLC discharge water may be supplied by pumps 1505 resident in the supporting drilling vessel. That water is conducted downward 1507 through the annular area 1509 between the outside diameter of the buoyancy modules 1508 and the inside diameter of the telescoping BLC sheath 1501. In the embodiment shown, in order to furnish the telescoping feature of the BLC sheath 1501, the cylindrical sections of the BLC sheath 1501 decrease in diameter, from section to section, with depth-wise position. Thus, when fully nested by contraction to the nominal height of a single section 1510, as shown in FIG. 15B, the outermost section 1511, having the greatest diameter, will reside at the top of the BLC sheath 1501 when extended; whereas the innermost section 1512, having the smallest diameter, will reside at the greatest depth when deployed.

The annular space 1509 of the discharge water supply flow path may therefore decrease with increasing depth-wise position. This feature promotes hydraulic and material-use efficiency since it provides a more or less constant downward velocity 1507 of the discharge water supply flow in the annular space 1509. This is because each cylindrical section of the BLC sheath 1501 removes a portion of the supply flow to discharge through its immediately contiguous slot-nozzles 1540. The annular flow area at the top 1511 of the BLC sheath 1501 is greatest, just where the discharge water supply flow is also greatest. In all parts of the depth-wise extent of the BLC sheath 1501, the annulus space 1509 can be maintained large enough to minimize the downward water flow velocities 1507 and associated hydraulic head (pressure) losses.

An adjustable seal 1513 may be located at the bottom of the BLC sheath 1501, i.e., the lowest region of the section of smallest diameter 1512 of the BLC sheath 1501. In the example illustrated in FIG. 15D, this seal 1513 is in the form of an elastic, water-inflated toroidal ring. When inflated with water, e.g., under remote control by operators on the drilling vessel, the toroid 1513 bridges the terminal annulus gap 1514 between the inside diameter of the BLC sheath 1501 and the outside diameter of the buoyancy module 1508 of the riser 1500, and thereby minimizes leakage of the discharge supply out of the bottom end of the BLC sheath 1501. Riser buoyancy modules 1508 may be treated to minimize leakage of discharge water flow through longitudinal passages 1550 within the riser buoyancy module 1508 to which the seal 1513 is affixed.

The controllable toroidal seal 1513 may also provide a mechanical grip by which the terminal BLC sheath section 1512 may be attached or detached from the riser structure 1508. When the toroidal seal 1513 is partially relaxed, the riser 1500 may be deployed or retrieved while applying only a little vertical frictional tension or compression load to the BLC sheath 1501, while still providing a useful degree of sealing. When the toroidal seal 1513 is fully inflated so as to grip the riser buoyancy module 1508, deploying the riser 1500 will also extend the telescoping riser BLC sheath 1501. Similarly, retrieving the riser 1500 will retract the telescoping riser BLC sheath 1501.

So long as the discharge water 1520 is supplied at adequate head 1521, BLC will operate at all areas of the partially extended telescoping BLC sheath 1501 that are externally exposed to the sea. Thus, the BLC actions of drag reduction and VIV avoidance are operable even in the transient states of actively running or retrieving the riser 1500, as well as while drilling or running drill pipe when the riser 1500 is stationary. This is a unique and most valuable feature of the riser telescoping BLC sheath concept. Furthermore, the BLC sheath 1501 resides in the depth ranges 1522 occupied by the severe currents (near the surface in the GOM). It need not be provided at depths without severe currents where anti-drag and anti-VIV features would generally not be useful.

In deploying riser with a blow-out preventer ("BOP"), the following procedure may be used. First, a portion of the bottom-most riser joint is put down through the drilling floor and through the nested BLC sheath 1501 (FIG. 15B) residing there. The nested BLC sheath 1501 is cast off from the vessel structure and is allowed to rest on a set of chock-arms radiating from the riser joint that have been inserted near its lower end. The riser joint, with the nested sheath hanging on it, is then swung in the usual way to where the BOP resides below the drilling floor, and is connected to the BOP. The riser joint with attached BOP is then swung back to a position at the center of the rotary where the top of the BLC sheath 1501 may be re-attached to the vessel's structure (presumably a heave-compensated part). The terminal seal 1513 is then inflated to grip the riser 1500, and the first joint lowered. Before the BLC sheath 1501 reaches the sea surface, the discharge water flow is established in the annular space 1509, perhaps at a reduced flow rate. The riser 1500, with attached BOP, is now run in the normal way until the BLC sheath 1501 is fully extended, with full discharge water flow rate. At this point, the toroidal seal 1513 is relaxed somewhat to a sliding fit, and deployment of the riser 1500 resumes and proceeds until connection is made at the wellhead. The seal 1513 can then be tightened for long term BLC operating protection of the riser 1500. Retrieval of the riser 1500 alone or with the BOP may be done in reverse order of the above-stated procedure.

A set of cables 1523 may be rigged from a dedicated winch on the drilling vessel 1506, down though the annular space 1509, to the bottom plate of the terminal section 1512 of the BLC sheath 1501. By collectively retracting these cables 1523, the terminal seal 1513 may be made to rapidly jump the gap 1524 between the buoyancy modules 1508 of adjacent riser joints, thus minimizing lost discharge water supply and the associated time intervals when BLC effectiveness may be reduced. These same cables 1523 may be used to retract the telescoping BLC sheath 1501 independently of the riser 1500. The telescoping BLC sheath 1501 may be extended by an internal hydrostatic pressure exceeding that of the sea. The elevation 1521 of the water surface within the topmost sheath sections 1511 relative to the sea surface 1525 measures the head of water available for creating the jetting velocity, overcoming losses and extending the BLC sheath 1501.

Production Riser BLC

Production risers are generally smaller in diameter than drilling risers and, unlike the latter, are usually deployed in parallel in groups of six or more. When beset by ocean currents, each of these risers is subject to hydrodynamic drag and VIV. These effects are undesirable because they incur time-mean and oscillatory fatigue inducing stresses in the riser materials and their supporting structures. The hydrodynamic effects are complicated by mutual interferences among and between the relatively closely spaced riser cylinders.

Figure 16A:
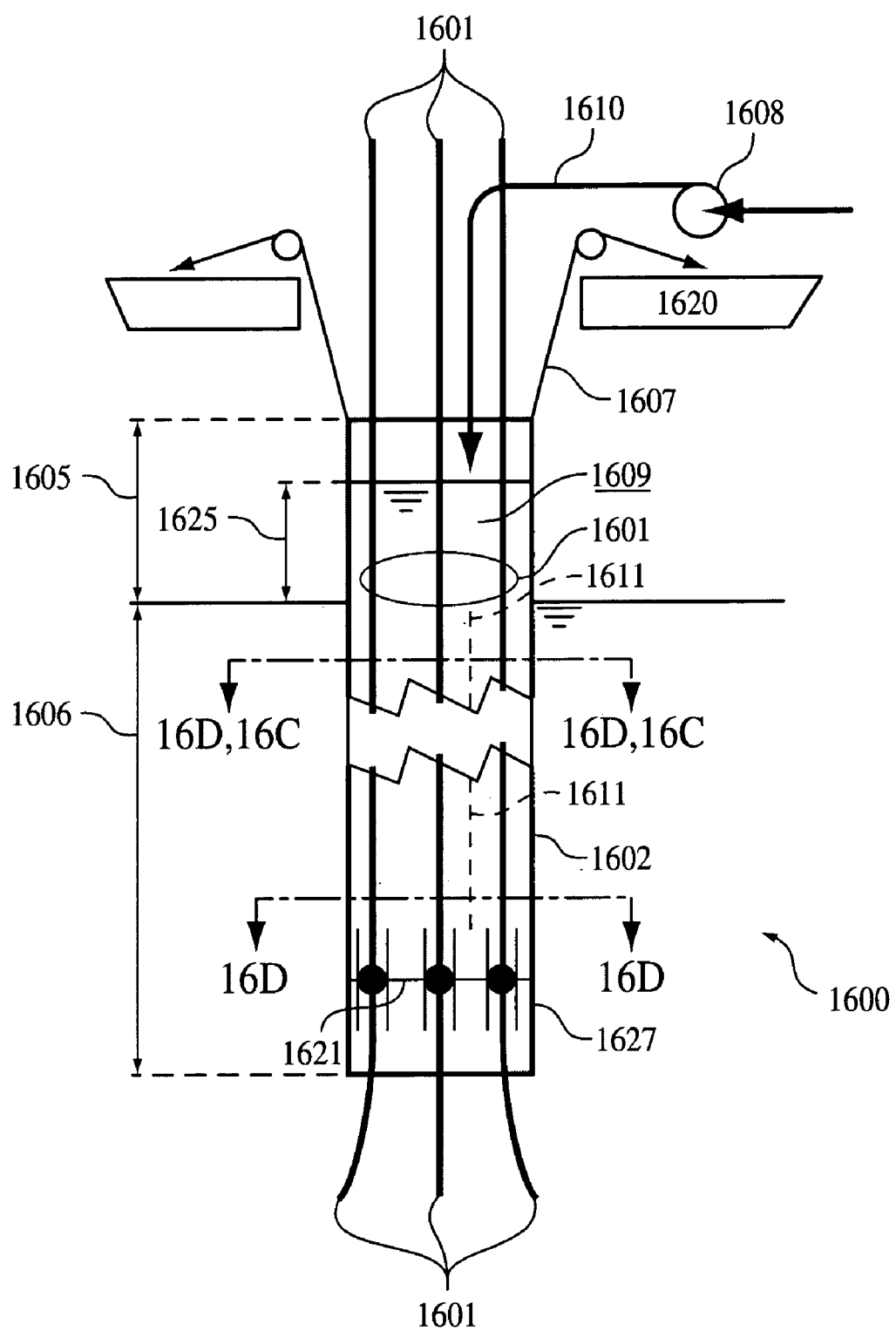
FIG. 16A is a production riser BLC sheath, vertical-centerline section.

FIG. 16A shows an exemplary production riser system 1600 for protecting a group of production risers 1601 against current-induced drag and VIV by a cylindrical sheath 1602 fitted with BLC. The group of production risers 1601 will typically consist of seven (7) or nineteen (19) vertically oriented, individual riser pipes arranged in a symmetric hexagonal pattern, when viewed in a horizontal plane section. With this arrangement, each riser pipe 1601 is horizontally spaced approximately equally from each of its immediate neighbors in the group, and the circumference of the group is minimized. Of course, those skilled in the art will recognize that the current invention can be used with other groupings of production riser pipes.

Figure 16B:
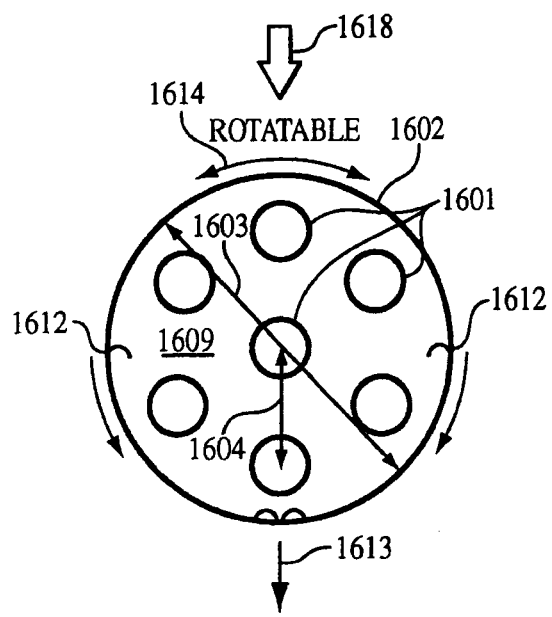
FIG. 16B is a typical horizontal section of FIG. 16A along line 16B—16B showing an embodiment of slot-nozzles for a rotate-able BLC sheath.

The BLC sheath 1602 may be in the form of a tube surrounding the hexagonally-arranged bundle of risers 1601, as shown in FIG. 16B. The inside diameter 1603 of he BLC sheath 1602 may be equal to not more than three times (3×) the center-to-center intertube spacing 1604 of the hexagonal array of risers 1601, if on seven pipes; and five times (5×), if of nineteen pipes. The BLC sheath 1602 may extend from a height 1605 somewhat above the waterline 1615 to a depth 1606 encompassing the main body of the surface current in which it is to be immersed, and from which it is to protect the production risers 1601. In the GOM, this depth is approximately 200 feet, commensurate with that of the usual loop current. However, greater or lesser depth extents of the BLC sheath 1602 may be provided to accommodate the depth of threatening currents.

The BLC sheath 1602 may be suspended 1607 from and supported by the vessel or rig 1620 from which the production risers 1601 are deployed. The BLC sheath 1602 may be fabricated of metal, plastic and/or composite materials.

The BLC sheath 1602 will be supplied with discharge water supply by pumps 1608 aboard the supporting vessel or rig 1620. The discharge water 1610 will be conducted downward to the sheath's discharge water slot-nozzles in the space 1609 interior to the inside diameter of the BLC sheath 1602 and outside of the several riser pipes 1601 that the BLC sheath 1602 surrounds. The interstitial space 1609 may be large enough to insure small vertical velocities and small resulting head losses in the downward flowing discharge water. The elevation of the water surface 1625 within the BLC sheath 1602 relative to that of the sea surface 1615 measures the head of water available for creating the discharge velocity and overcoming losses.

Figure 16C:
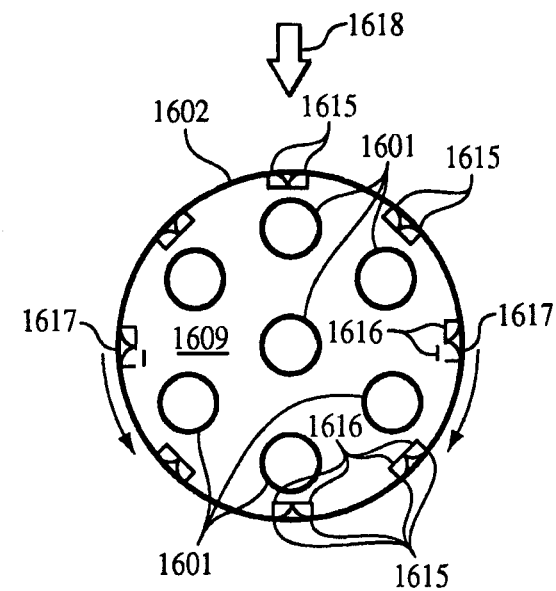
FIG. 16C is a typical horizontal section of FIG. 16A along line 16C—16C showing an alternative embodiment of slot-nozzles for a fixed BLC sheath.

The BLC sheath 1602 may be fitted with vertically continuous or intermittent slot-nozzles 1611 in accord with principles previously elucidated in this application. The slot-nozzles 1611 will be arranged either: (1) in one or more pairs 1612 (plus, possibly, a tail-jet 1613, as described above) symmetric about an axis that may be aligned to the direction of the current 1618 by rotation 1614 of the entire BLC sheath 1602 about the stationary riser array 1601; or (2) as a plurality of equally angularly spaced slot-nozzles 1617, as shown in FIG. 16C, and an independently selectable and controlled strip-valve 1616 may be provided so that pairs of slot-nozzles 1617 that are approximately symmetric with respect to the direction of incident current 1618 may be energized, without rotation of the BLC sheath 1602.

Figure 16D:
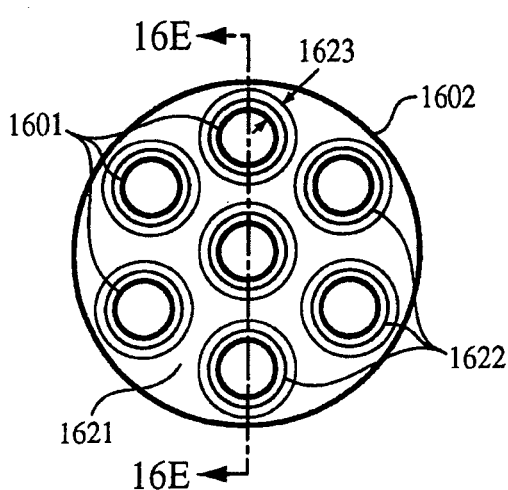
FIG. 16D is a horizontal section of the lower end of FIG. 16A along lines 16D—16D showing distal closure, seals, and guide tubes.
Figure 16E:
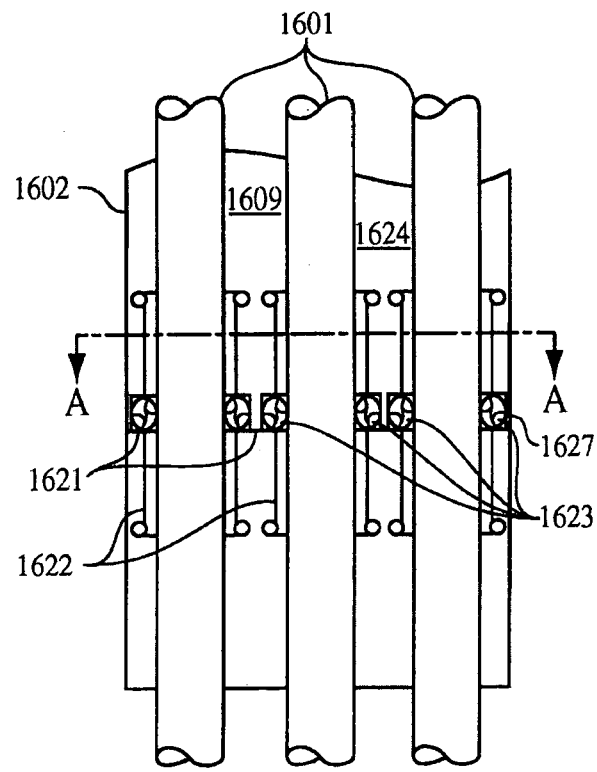
FIG. 16E is a cut-away side view of FIG. 16D along line 16E—16E.

Referring to FIGS. 16D and 16E, a horizontal terminal closure plate 1621 may be employed. The closure plate 1621 will contain and be pierced by a number of vertical tubes 1622, equal in number to the maximum number of risers 1601 to be enclosed. The inside diameter of each vertical tube 1622 may exceed the outside diameter of the riser pipes 1601 or of any flange or any other appurtenance that may be attached to a riser pipe 1601 and that must be passed through such termination. Annular gaps 1623 between the riser pipes 1601 and the vertical tubes 1622 may be sealed against leakage of discharge-water supply 1624 by inflation of annular seals 1623. If fewer than the full hexagonal array of riser pipes 1601 are to be installed, the unused passages may be plugged with short, closed lengths of riser pipe fitted within the seals.

Where riser heave compensation is required, the BLC sheath 1602, with the enclosed riser bundle 1601, may be compensated as a unit.

A number of embodiments of the invention have been described. Nevertheless, it will be understood that various modifications may be made without departing from the spirit and scope of the invention. For example, to compensate for directional changes in onset current, rotate-able riser BLC may be implemented, or multiple pairs of slot-nozzles may be disposed around a riser for BLC. In addition, different configurations of slot-nozzles may be employed, or pinpoint nozzles may be substituted for slot-nozzles. In the production riser of FIG. 16, any number of production riser pipes 1601 may be included, in virtually any configuration within the BLC sheath 1602.

Accordingly, other embodiments are within the scope of the following claims.

What is claimed is:

1. A marine riser, comprising:
   (a) a riser pipe having an outer riser pipe surface;
   (b) an annular sheath surrounding the riser pipe and forming a conduit between the outer riser pipe surface and an inner surface of the annular sheath, the annular sheath having an outer surface;
   (c) at least one pair of nozzles for discharging water carried by the conduit out of the annular sheath in a direction substantially tangential to the outer surface of the annular sheath;
   (d) when the marine riser is beset by a current, the discharge of water by the at least one pair of nozzles substantially preventing flow separation of the current on a down-current side of the marine riser and thereby substantially preventing hydrodynamic drug and vortex induced vibration (VIV) that the marine riser would experience in the absence of the discharge of water by the at least one pair of nozzles; and
   a system for pumping water through the conduit to at least one of the pair of nozzles,
   a system for rotating the annular sheath including a gear for rotating the annular sheath and the at least one pair of nozzles relative to the riser pipe and a gear motor for driving the gear,
   wherein the system for rotating the annular sheath further includes a ring gear supported by a bulkhead surrounding the riser pipe and at least one pinion gear for engaging the ring gear,
   wherein the annular sheath includes an inner tube surrounding the riser pipe and an outer tube surrounding the inner tube, wherein a region is formed between the riser pipe and the inner tube, the region containing buoyancy material, and wherein the system for rotating the annular sheath is for rotating the outer tube, the inner tube, and the at least one pair of nozzles relative to the riser pipe.

2. A marine riser, comprising:
   (a) a riser pipe having an outer riser pipe surface;
   (b) a telescoping annular sheath surrounding the riser pipe and forming a conduit between the outer riser pipe surface and an inner surface of the telescoping annular sheath, the telescoping annular sheath including:
      (1) a first cylindrical section; and
      (2) a second cylindrical section that can be substantially inserted in and substantially extended from the first cylindrical section;
   (c) at least one pair of nozzles extending through at least one of the first and second cylindrical sections of the telescoping annular sheath for discharging water carried by the conduit out of the telescoping annular sheath in a direction substantially tangential to the outer surface of the telescoping annular sheath; and
   (d) when the marine riser is beset by a current, the discharge of water by the at least one pair of nozzles substantially preventing flow separation of the current on a down-current side of the marine rise and thereby substantially preventing hydrodynamic drag and vortex induced vibration (VIV) that the marine riser would experience in the absence of the discharge of water by the at least one pair of nozzles;
   wherein the second cylindrical section includes a seal for engaging the riser pipe and for substantially preventing water from escaping the conduit.

3. A marine riser, comprising:
   (a) a riser pipe having an outer riser pipe surface;
   (b) a telescoping annular sheath surrounding the riser pipe and forming a conduit between the outer riser pipe surface and an inner surface of the telescoping annular sheath, the telescoping annular sheath including:
      (1) a first cylindrical section; and
      (2) a second cylindrical section that can be substantially inserted in and substantially extended from the first cylindrical section;
   (c) at least one pair of nozzles extending through at least one of the first and second cylindrical sections of the telescoping annular sheath for discharging water carried by the conduit out of the telescoping annular sheath in a direction substantially tangential to the outer surface of the telescoping annular sheath; and
   (d) when the marine riser is beset by a current, the discharge of water by the at least one pair of nozzles substantially preventing flow separation of the current on a down-current side of the marine riser and thereby substantially preventing hydrodynamic drag and vortex induced vibration (VIV) that the marine riser would experience in the absence of the discharge of water by the at least one pair of nozzles,
   wherein the second cylindrical section includes a seal for engaging the riser pipe and for substantially preventing water from escaping the conduit, wherein the riser pipe is surrounded at least in part by at least one annular buoyancy ring, and wherein the seal comprises an inflatable toroidal ring that is controllably inflatable and deflatable to engage each buoyancy ring.

4. A marine riser, comprising:
   (a) a riser pipe having an outer riser pipe surface;
   (b) a telescoping annular sheath surrounding the riser pipe and forming a conduit between the outer riser pipe surface and an inner surface of the telescoping annular sheath, the telescoping annular sheath including:
      (1) a first cylindrical section, and
      (2) a second cylindrical section that can be substantially inserted in and substantially extended from the first cylindrical section;
   (c) at least one pair of nozzles extending through at least one of the first and second cylindrical sections of the telescoping annular sheath for discharging water carried by the conduit out of the telescoping annular sheath in a direction substantially tangential to the outer surface of the telescoping annular sheath;
   (d) when the marine riser is beset by a current, the discharge of water by the at least one pair of nozzles substantially preventing flow separation of the current on a down-current side of the marine riser and thereby substantially preventing hydrodynamic drag and vortex induced vibration (VIV) that the marine riser would experience in the absence of the discharge of water by the at least one pair of nozzles; and (e) at least one cable extending from an upper terminus of the marine riser to a bottom terminus of the second cylindrical section for reducing loss of discharge water during retraction of the telescoping annular sheath.

* * * * *